United States Patent
Strzempko et al.

(10) Patent No.: US 7,191,734 B2
(45) Date of Patent: *Mar. 20, 2007

(54) APPARATUS FOR TRANSPORTING LABORATORY ANIMALS

(75) Inventors: John J. Strzempko, Ashburnham, MA (US); Thomas Peterson, Sacramento, CA (US); John Vollmer, Mount Desert, ME (US)

(73) Assignees: TRW Automotive U.S. LLC, Livonia, MI (US); The Jackson Laboratory, Bar Harbor, ME (US)

( * ) Notice: Subject to any disclaimer, the term of this patent is extended or adjusted under 35 U.S.C. 154(b) by 169 days.

This patent is subject to a terminal disclaimer.

(21) Appl. No.: 10/502,260

(22) PCT Filed: Jan. 24, 2003

(86) PCT No.: PCT/US03/02084

§ 371 (c)(1),
(2), (4) Date: Jul. 21, 2004

(87) PCT Pub. No.: WO03/063726

PCT Pub. Date: Aug. 7, 2003

(65) Prior Publication Data

US 2005/0028751 A1    Feb. 10, 2005

Related U.S. Application Data

(63) Continuation-in-part of application No. 10/057,676, filed on Jan. 25, 2002, now Pat. No. 6,588,373.

(51) Int. Cl.
    *A01K 1/00* (2006.01)
(52) U.S. Cl. .................. 119/496; 119/416
(58) Field of Classification Search .......... 119/482, 119/416, 452–453, 417
    See application file for complete search history.

(56) References Cited

U.S. PATENT DOCUMENTS

| 2,988,044 A | 6/1961 | Adelberg et al. |
| 3,537,428 A | 11/1970 | Montgomery |
| 3,654,534 A | 4/1972 | Fischer |
| 4,130,088 A | 12/1978 | Salvia |

(Continued)

FOREIGN PATENT DOCUMENTS

EP    0 201 436 B1    1/1990

*Primary Examiner*—Teri Pham Luu
*Assistant Examiner*—Kimberly S. Smith
(74) *Attorney, Agent, or Firm*—Tarolli, Sundheim, Covell & Tummino LLP

(57) ABSTRACT

An apparatus (10) for transporting laboratory animals comprises a container (12), a cover piece (14), and a closure piece (16). The container (12) has an open top. The cover piece (14) is connectable with the container (12) for closing the open top of the container (12). The cover piece (14) has a passage (188) through which the at least one laboratory animal passes during insertion into and extraction from a cavity (28). The closure piece (16) includes a portion (234) that is rotatable relative to the cover piece (14) between a first position in which the portion (234) of the closure piece (16) closes the passage (188) in the cover piece (14) and a second position in which the passage (188) in the cover piece (14) is open to permit the insertion and extraction of the at least one laboratory animal through the passage (188).

22 Claims, 12 Drawing Sheets

U.S. PATENT DOCUMENTS

| | | | |
|---|---|---|---|
| 4,480,587 A * | 11/1984 | Sedlacek | 119/419 |
| 4,640,228 A | 2/1987 | Sedlacek et al. | |
| 4,907,536 A | 3/1990 | Chrisler | |
| 5,000,120 A | 3/1991 | Coiro, Sr. et al. | |
| 5,044,316 A | 9/1991 | Thomas | |
| 5,174,241 A | 12/1992 | Goguen et al. | |
| 5,349,924 A * | 9/1994 | Hooper, Jr. | 119/496 |
| 5,572,953 A | 11/1996 | Phelan et al. | |
| 6,523,499 B1 * | 2/2003 | Chrisco et al. | 119/496 |
| 6,543,387 B1 * | 4/2003 | Stein | 119/419 |
| 6,588,373 B1 | 7/2003 | Strzempko et al. | |
| 6,877,269 B2 * | 4/2005 | Schultz | 43/55 |

* cited by examiner

APPARATUS FOR TRANSPORTING LABORATORY ANIMALS

RELATED APPLICATIONS

This application is a continuation-in-part of application Ser. No. 10/057,676, filed Jan. 25, 2002, now U.S. Pat. No. 6,588,373.

TECHNICAL FIELD

The present invention relates to an apparatus for transporting animals. Particularly, the present invention relates to an apparatus for transporting laboratory animals such as rodents.

BACKGROUND OF THE INVENTION

It may be desirable to transport laboratory animals between various laboratory facilities. Many times, it is desirable to transport the laboratory animals in a sterile environment. Some known apparatuses for transporting laboratory animals are formed from sterile cardboard. These cardboard apparatuses generally cannot withstand a second sterilization process and thus, cannot be reused. An apparatus for transporting laboratory animals that may be reused is desirable. Such apparatus must be durable enough to withstand periodic sterilization.

Furthermore, the various laboratory facilities between which the laboratory animals are transported may be located in different nations. Thus, the apparatus housing the laboratory animals may be inspected when passing through customs of the different nations. Such inspection generally includes the interior of the apparatus. Contact between customs officials and the laboratory animals may not be desirable. Therefore, a need exists for an apparatus that allows inspection of the interior without opening of the apparatus.

SUMMARY OF THE INVENTION

The present invention relates to an apparatus for transporting laboratory animals. The apparatus comprises a container, a cover piece, and a closure piece. The container defines a cavity for housing at least one laboratory animal. The container has an open top. The cover piece is connectable with the container for closing the open top of the container. The cover piece has a passage through which the at least one laboratory animal passes during insertion into and extraction from the cavity. The closure piece is associated with the cover piece and includes a portion that is rotatable relative to the cover piece between a first position in which the portion of the closure piece closes the passage in the cover piece to retain the at least one laboratory animal within the cavity and a second position in which the passage in the cover piece is open to permit the insertion and extraction of the at least one laboratory animal through the passage. The closure piece also includes a plurality of air passages that permit airflow into and out of the cavity. Filter material covers the air passages for preventing contaminants from entering the cavity.

In a second aspect, the present invention relates to an apparatus for transporting laboratory animals. The apparatus comprises a container defining a cavity for housing at least one laboratory animal. The container has a rim that defines an open top of the container. A cover piece is adapted to snap onto the rim of the container for connecting the cover piece to the container for closing the open top of the container. The cover piece includes structure for securing the cover piece on the container to prevent removal of the cover piece from the container by the at least one laboratory animal. The cover piece further includes a passage through which the at least one laboratory animal passes during insertion into and extraction from the cavity. The apparatus also includes a closure piece that is adapted to be supported by the cover piece. The closure piece includes a portion that is rotatable relative to the cover piece between a first position in which the portion of the closure piece closes the passage in the cover piece to retain the at least one laboratory animal within the cavity and a second position in which the passage in the cover piece is open to permit the insertion and extraction of the at least one laboratory animal through the passage.

According to another aspect, the present invention relates to an apparatus for transporting laboratory animals. The apparatus comprises a container that defines a cavity for housing at least one laboratory animal. The container has a bottom wall, at least one side wall, and an open top. The at least one side wall includes a plurality of air passages that permit airflow into and out of the cavity. Filter material covers the air passages for preventing contaminants from entering the cavity. The apparatus also comprises structure for closing the open top of the container for retaining the at least one laboratory animal in the cavity. The structure includes a first mating protrusion that extends outwardly in a first direction from the structure. The first mating protrusion is constructed for engaging a corresponding mating projection of an adjacent apparatus so as to prevent movement of the apparatus relative to the adjacent apparatus in a second direction that is perpendicular to the first direction.

BRIEF DESCRIPTION OF THE DRAWINGS

The foregoing and other features of the present invention will become apparent to those skilled in the art to which the present invention relates upon reading the following description with reference to the accompanying drawings, in which.

DETAILED DESCRIPTION OF THE INVENTION

Figure 1:
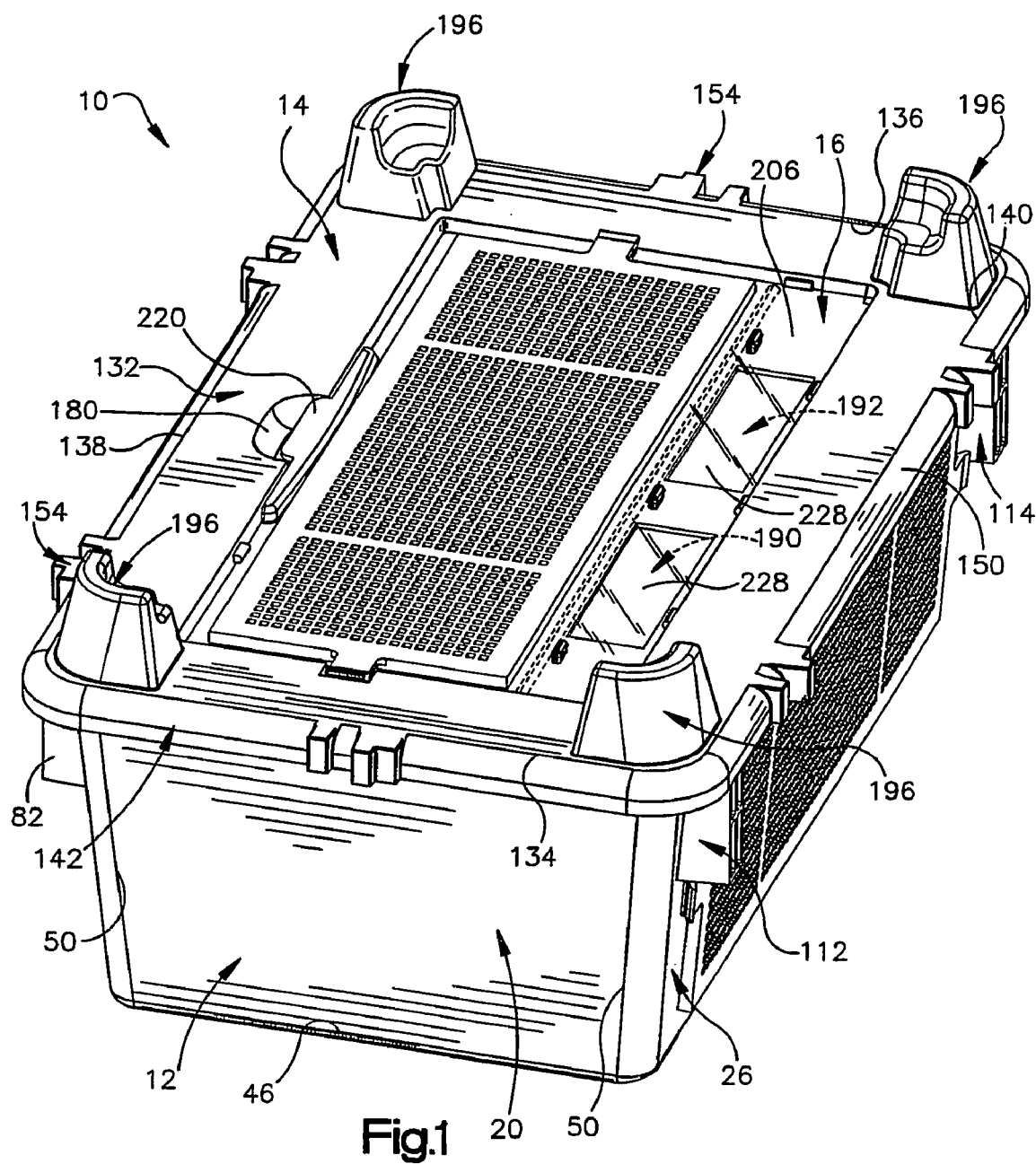
FIG. 1 is a perspective view of an apparatus constructed in accordance with the present invention.

FIG. 1 is a perspective view of an apparatus 10 constructed in accordance with the present invention. The apparatus 10 is a transport device for transporting at least one laboratory animal, such as a rodent. The apparatus 10 includes a container 12, a cover piece 14, and a closure piece 16.

Figure 2:
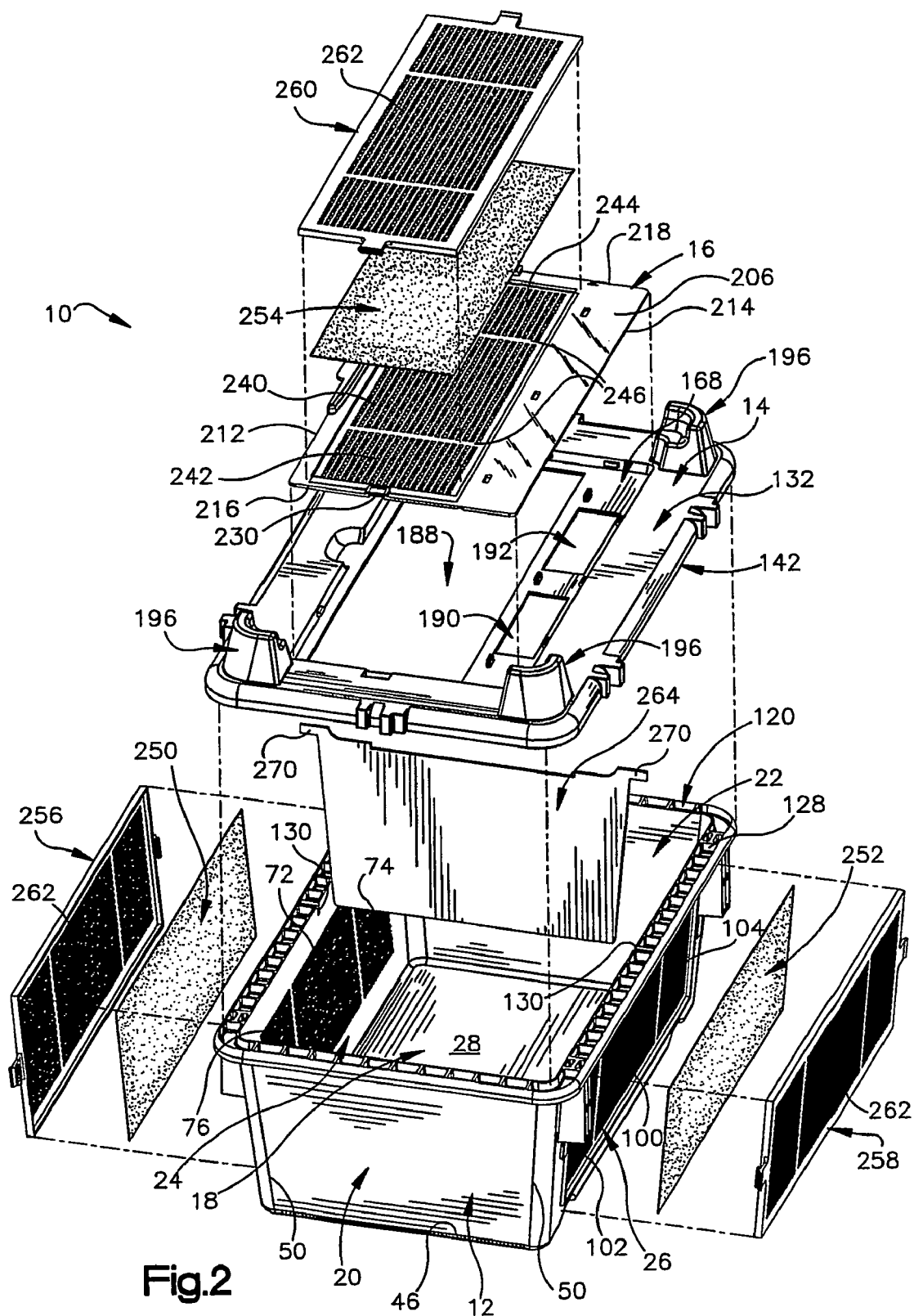
FIG. 2 is a perspective exploded view of the apparatus of FIG. 1.

As shown in FIG. 2, the container 12 includes a bottom wall 18, first and second end walls 20 and 22, respectively, first and second side walls 24 and 26, respectively, and an open top. A cavity 28 is defined within the container 12 in the space between the bottom wall 18 and the open top, between the first and second end walls 20 and 22, and between the first and second side walls 24 and 26. The cavity 28 houses at least one laboratory animal (not shown). The container 12 is constructed so that laboratory animals may only be inserted into and extracted from the cavity 28 through the open top.

Figure 6:
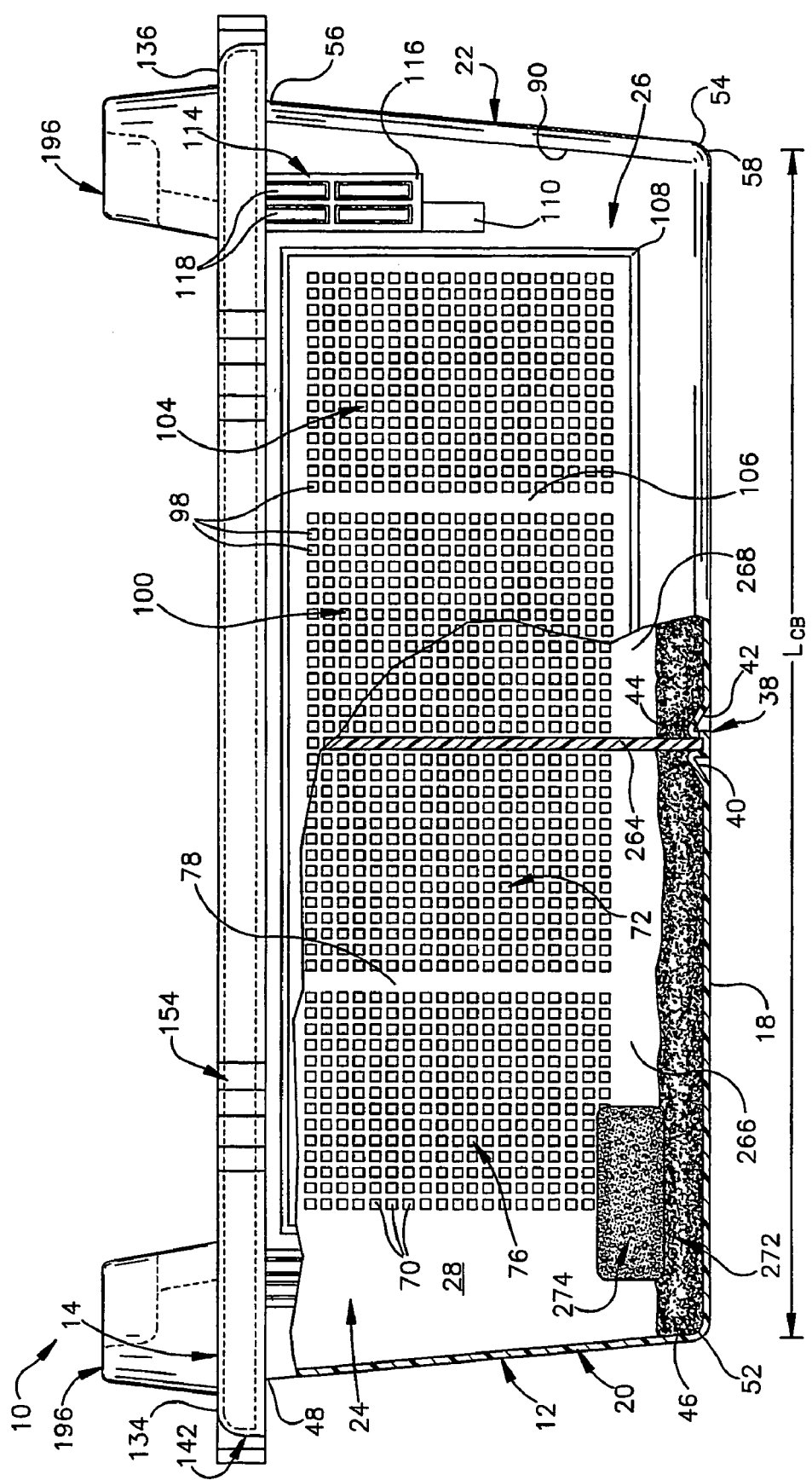
FIG. 6 is an elevation view of the apparatus of FIG. 1 including a cutaway illustrating a portion of a cavity within the apparatus.

The bottom wall 18 of the container 12 is a generally rectangular, planar surface with rounded corners. A length of the bottom wall 18, indicated by $L_{CB}$ in FIG. 6, is approximately twice as long as a width of the bottom wall 18, indicated by $W_{CB}$ in FIG. 4. Thus, the bottom wall 18 includes two long edges along its length $L_{CB}$ and two short edges along its width $W_{CB}$.

The bottom wall 18 may include multiple pairs of indexing projections 38, one of which is shown in FIG. 6. Each pair of indexing projections 38 includes a first indexing projection 40 and a second indexing projection 42. The first indexing projection 40 is spaced from the second indexing projection 42 so that a slot 44 is formed between them. The slot 44 extends perpendicular to the long edges of the bottom wall 18.

The first end wall 20 of the container 12 extends upwardly from the bottom wall 18. As shown in FIG. 2, the first end wall is trapezoidal and has parallel lower and upper edges 46 and 48 (FIG. 6), respectively, and angled side edges 50 (FIG. 1). The upper edge 48 of the first end wall 20 is longer than the lower edge 46 of the first end wall. The lower edge 46 of the first end wall 20 has a length that is approximately equal to the width $W_{CB}$ of the bottom wall 18. A rounded edge 52 (FIG. 6) connects the lower edge 46 of the first end wall 20 with an associated one of the short edges of the bottom wall 18. The first end wall 20 extends at an angle of greater than ninety degrees relative to the bottom wall 18 such that the upper edge 48 of the first end wall extends outwardly beyond the associated short edge of the bottom wall 18.

The second end wall 22 of the container 12 is similar to the first end wall 20. The second end wall 22 also extends upwardly from the bottom wall 18. The second end wall 22 is trapezoidal and has parallel lower and upper edges 54 and 56 (FIG. 6), respectively, and angled side edges (not shown). The upper edge 56 of the second end wall 22 is longer than the lower edge 54 of the second end wall. The lower edge 54 of the second end wall 22 has a length that is approximately equal to the width $W_{CB}$ of the bottom wall 18. A rounded edge 58 (FIG. 6) connects the lower edge 54 of the second end wall 22 with the other short edge of the bottom wall 18. The second end wall 22 extends at an angle of greater than ninety degrees relative to the bottom wall 18 such that the upper edge 56 of the second end wall extends outwardly beyond the other short edge of the bottom wall.

Figure 4:
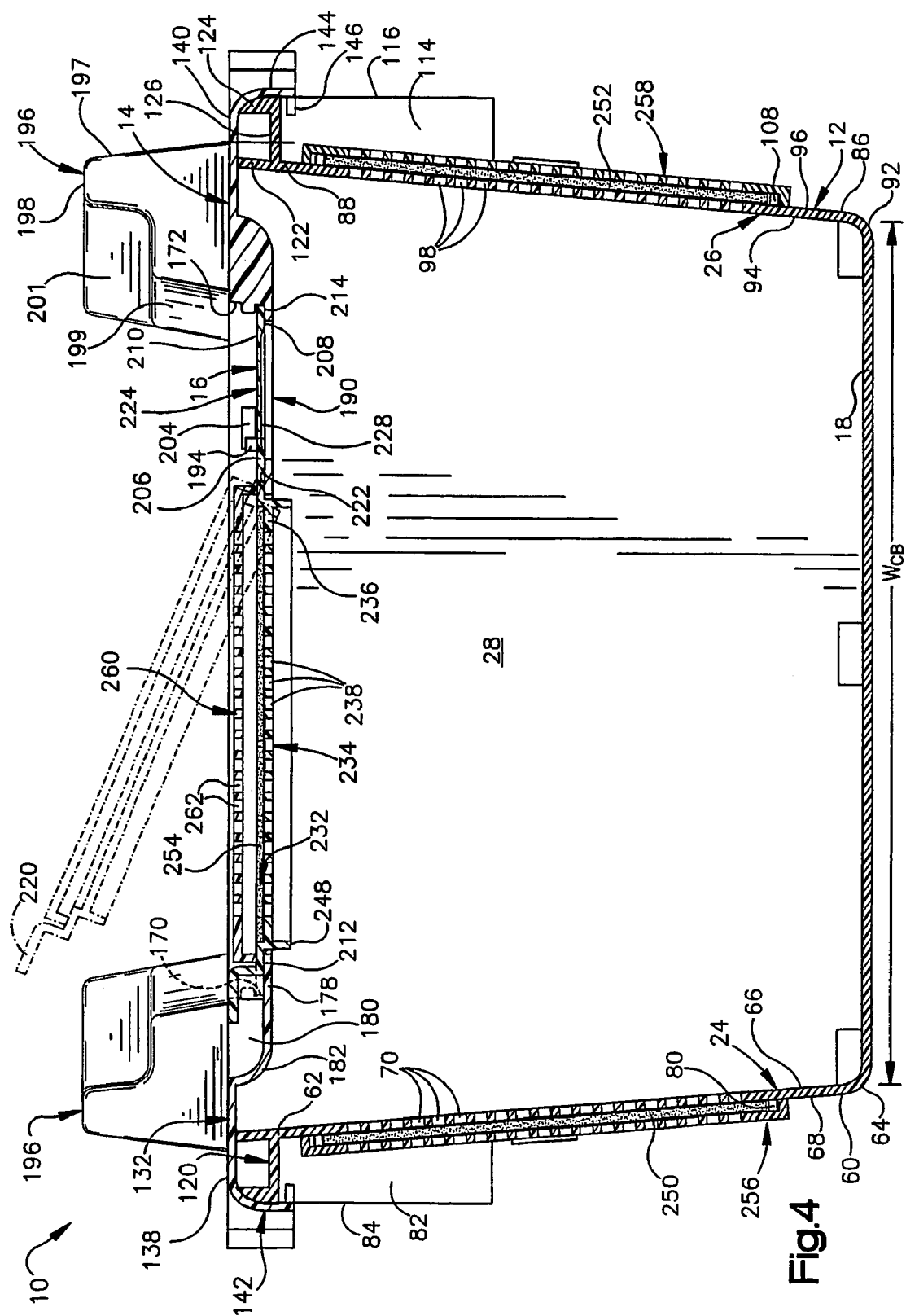
FIG. 4 is a view taken along line 4—4 in FIG. 3.

As shown in FIG. 4, the first side wall 24 of the container 12 also extends upwardly from the bottom wall 18. The first side wall 24 has a trapezoidal shape and includes parallel lower and upper edges 60 and 62 (FIG. 4), respectively, and angled first and second side edges (not shown). The upper edge 62 of the first side wall 24 is longer than the lower edge 60 of the first side wall. The lower edge 60 of the first side wall 24 has a length that is approximately equal to the length $L_{CB}$ of the bottom wall 18. A rounded edge 64 (FIG. 4) connects the lower edge 60 of the first side wall 24 with an associated one of the long edges of the bottom wall 18. The first side wall 24 extends at an angle of greater than ninety degrees relative to the bottom wall 18 such that the upper edge 62 of the first side wall extends outwardly beyond the associated long edge of the bottom wall.

The first side wall 24 also includes inner and outer surfaces 66 and 68 (FIG. 4), respectively. The inner and outer surfaces 66 and 68 are planar and extend parallel to one another. A plurality of air passages 70 extends through the first side wall 24 from the inner surface 66 to the outer surface 68. The air passages 70 allow air flow into and out of the cavity 28 of the container 12. As shown in FIG. 6, each air passage 70 is preferably square with preferred dimensions of three millimeters by three millimeters. Preferably, two millimeters separate each air passage 70 from each adjacent air passage 70.

As partially shown in FIG. 2, the plurality of air passages 70 form three separate arrays 72, 74, and 76. An inner array 72 of air passages 70 is centered between the lower and upper edges 60 and 62 of the first side wall 24 and extends over approximately seventy-five percent of the distance between the lower and upper edges of the first side wall. The inner array 72 is also centered between the first and second side edges of the first side wall 24. The inner array 72 extends over a distance of approximately forty percent of the length of the lower edge 60 of the first side wall 24. A first outer array 74 is located between the inner array 72 and the first side edge of the first side wall 24. A second outer array 76 is located between the inner array 72 and the second side edge of the first side wall 24. Both the first and second outer arrays 74 and 76 extend between the lower and upper edges 60 and 62 of the first side wall 24 a distance equal to that of the inner array 72. A length of each of the first and second outer arrays 74 and 76 along the lower edge 60 of the first side wall 24 is approximately one-half the length of the inner array 72.

The first side wall 24 also includes two vertical ribs, a second of which is shown at 78 in FIG. 6. A first of the two vertical ribs separates the inner array 72 from the first outer array 74. The second 78 of the two vertical ribs separates the inner array 72 from the second outer array 76. A frame 80, a portion of which is shown in FIG. 4, protrudes outwardly from the outer surface 68 of the first side wall 24 and surrounds the arrays 72, 74, and 76 of air passages 70.

The first side wall 24 of the container 12 also includes two locking projections (not shown). A first locking projection is located adjacent the frame 80 near the first side edge of the first side wall 24. A second locking projection is located adjacent the frame 80 near the second side edge of the first side wall 24. The locking projections are centered relative to the frame 80. Each locking projection includes a locking portion (not shown) for interlocking with cooperating locking projections.

The first side wall 24 also includes two nesting protrusions, one of which is shown at 82 in FIG. 4. A first nesting protrusion is located adjacent the frame 80 near the first side edge of the first side wall 24. The first nesting protrusion extends from the first locking projection to the upper edge 62 of the first side wall 24 and extends outwardly of the outer surface 68 of the first side wall. A vertically extending outer face defines the outermost surface of the first nesting protrusion. A second nesting protrusion 82 is located adjacent the frame 80 near the second side edge of the first side wall 24. The second stacking protrusion 82 extends from the second locking projection to the upper edge 62 of the first side wall 24 and extends outwardly of the outer surface 68 of the first side wall. A vertically extending outer face 84 (FIG. 4) defines the outermost surface of the second nesting protrusion 82. A plurality of holes (not shown) may extend into the first and second nesting protrusions from the outer face of each nesting protrusion. The plurality of holes saves material when the nesting protrusions are molded.

The second side wall 26 of the container 12 is similar to the first side wall 24. The second side wall 26 also extends upwardly from the bottom wall 18. The second side wall 26 has a trapezoidal shape and includes parallel lower and upper edges 86 and 88 (FIG. 4), respectively, and angled first and second side edges, the second of which is shown at 90 in FIG. 6. The upper edge 88 of the second side wall 26 is equal in length to the upper edge 62 of the first side wall 24 and the lower edge 86 of the second side wall is equal in length to the lower edge 60 of the first side wall. A rounded edge 92 (FIG. 4) connects the lower edge 86 of the second side wall 26 with an associated one of the long edges of the bottom wall 18. The second side wall 26 extends at an angle of greater than ninety degrees relative to the bottom wall 18 such that the upper edge 88 of the second side wall extends outwardly beyond the associated long edge of the bottom wall.

The second side wall 26 also includes inner and outer surfaces 94 and 96 (FIG. 4), respectively. The inner and outer surfaces 94 and 96 are planar and extend parallel to one another. A plurality of air passages 98 extends through the second side wall 26 from the inner surface 94 to the outer surface 96. The air passages 98 allow air flow into and out of the cavity 28 of the container 12. As shown in FIG. 6, each air passage 98 is square with preferred dimensions of three millimeters by three millimeters. Preferably, two millimeters separate each air passage 98 from each adjacent air passage 98.

As shown in FIG. 2, the plurality of air passages 98 form three separate arrays 100, 102 and 104. The second side wall 26 includes an inner array 100 and first and second outer arrays 102 and 104, respectively, of air passages 98. The inner array 100 on the second side wall 26 has the same size and a corresponding location to the inner array 72 on the first side wall 24. The first and second outer arrays 102 and 104 also have the same sizes and corresponding locations to the first and second arrays 74 and 76 on the first side wall 24.

The second side wall 26 also includes two vertical ribs, one of which is shown at 106 in FIG. 6. A first of the two vertical ribs separates the inner array 100 from the first outer array 102. A second 106 of the two vertical ribs separates the inner array 100 from the second outer array 104. A frame 108, a portion of which is shown in FIG. 6, protrudes from the outer surface 96 of the second side wall 26 and surrounds the arrays 100, 102, and 104 of air passages 98.

The second side wall 26 of the container 12 also includes two locking projections, a second of which is shown at 110 in FIG. 6. A first locking projection is located adjacent the frame 108 near the first side edge of the second side wall 26. A second locking projection 110 is located adjacent the frame 108 near the second side edge 90 of the second side wall 26. The locking projections are centered relative to the frame 108. Each locking projection includes a locking portion (not shown) for interlocking with cooperating locking projections.

The second side wall 26 also includes first and second nesting protrusions 112 and 114 (FIG. 1), respectively. The first and second nesting protrusions 112 and 114 on the second side wall 26 correspond in size and location to the first and second nesting protrusions 82 of the first side wall 24. Vertically extending outer faces define outermost surfaces of the first and second nesting protrusions 112 and 114. FIGS. 4 and 6 illustrate the outer face 116 of the second nesting protrusion 114. A plurality of holes 118, four of which are shown in FIG. 6, extend into the second nesting protrusion 114 from the outer face 116. The holes 118 save material when the nesting protrusion 114 is molded.

Figure 5:
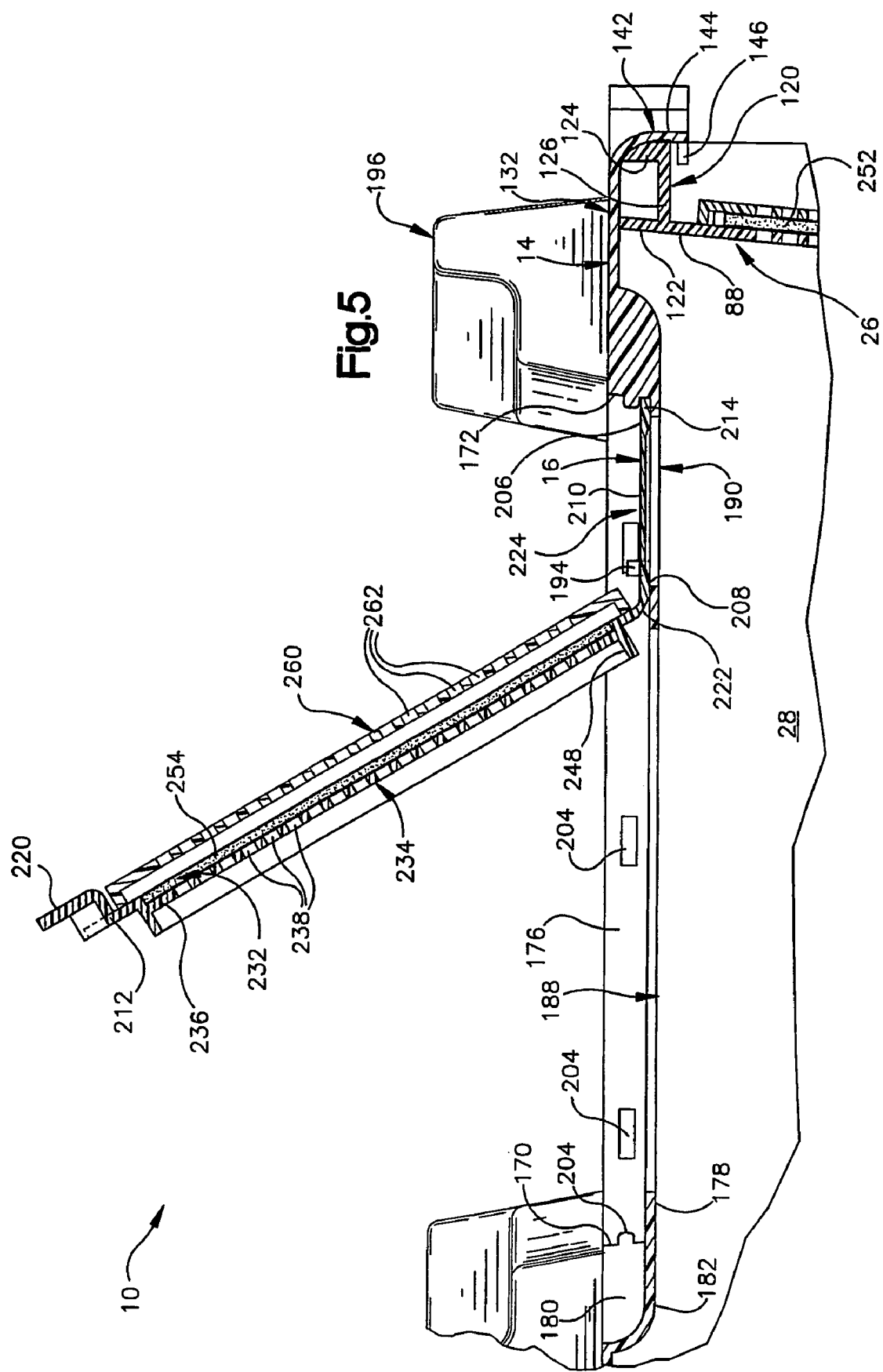
FIG. 5 is an enlarged view of a portion of the apparatus of FIG. 1 illustrating a rotatable portion of a closure piece in an open position.

Rounded corners connect the first and second side walls 24 and 26 to the first and second end walls 20 and 22. A rim 120 (FIG. 2) extends around the upper edges 48, 56, 62 and 88 of the first and second end walls 20 and 22 and the first and second side walls 24 and 26. The rim 120 is generally rectangular and defines the open top of the container 12. As shown in FIGS. 4 and 5, the rim 120 includes an inner wall 122 and an outer wall 124. The inner wall 122 of the rim 120 extends upwardly from the end walls 20 and 22 and the side walls 24 and 26. The outer wall 124 of the rim 120 extends parallel to the inner wall 122 and is located outwardly of the end walls 20 and 22 and the side walls 24 and 26. A lower wall 126 of the rim 120 connects the inner and outer walls 122 and 124. A series of small cavities 128 (FIG. 2) may be formed in the rim 120 between the inner and outer walls 122 and 124. The rim 120 may also include slots 130 (FIG. 2) that extend through the inner wall 122 of the rim on the first and second side walls 24 and 26. The slots 130 align with and extend parallel to the slot 44 formed by the pair of indexing projections 38.

The container 12 is preferably molded as one piece from a thermoplastic. Preferably, a polypropylene having high flow characteristics and having high heat stability characteristics is used. The wall thickness of each wall of the container 12, including the bottom wall 18, the end walls 20 and 22, and the side walls 24 and 26, is approximately two millimeters.

Since the end walls 20 and 22 and the side walls 24 and 26 extend upwardly from the bottom wall 18 at an angle of greater than ninety degrees, the open top of the container 12 is larger than the bottom wall 18 of the container. Thus, multiple containers 12 may be nested together by inserting the bottom wall 18 of a first container through the open top of a second container. When nested together, the nesting protrusions 82, 112, and 114 extending from the first and second side walls 24 and 26 of the first container rest on the rim 120 of the second container and prevent the first and second containers from wedging together. The nesting protrusions 82, 112, and 114 also space the bottom wall 18 of the first container away from the bottom wall 18 of the second container so that multiple containers 12 may be sterilized, preferably in an autoclave, while nested.

Figure 3:
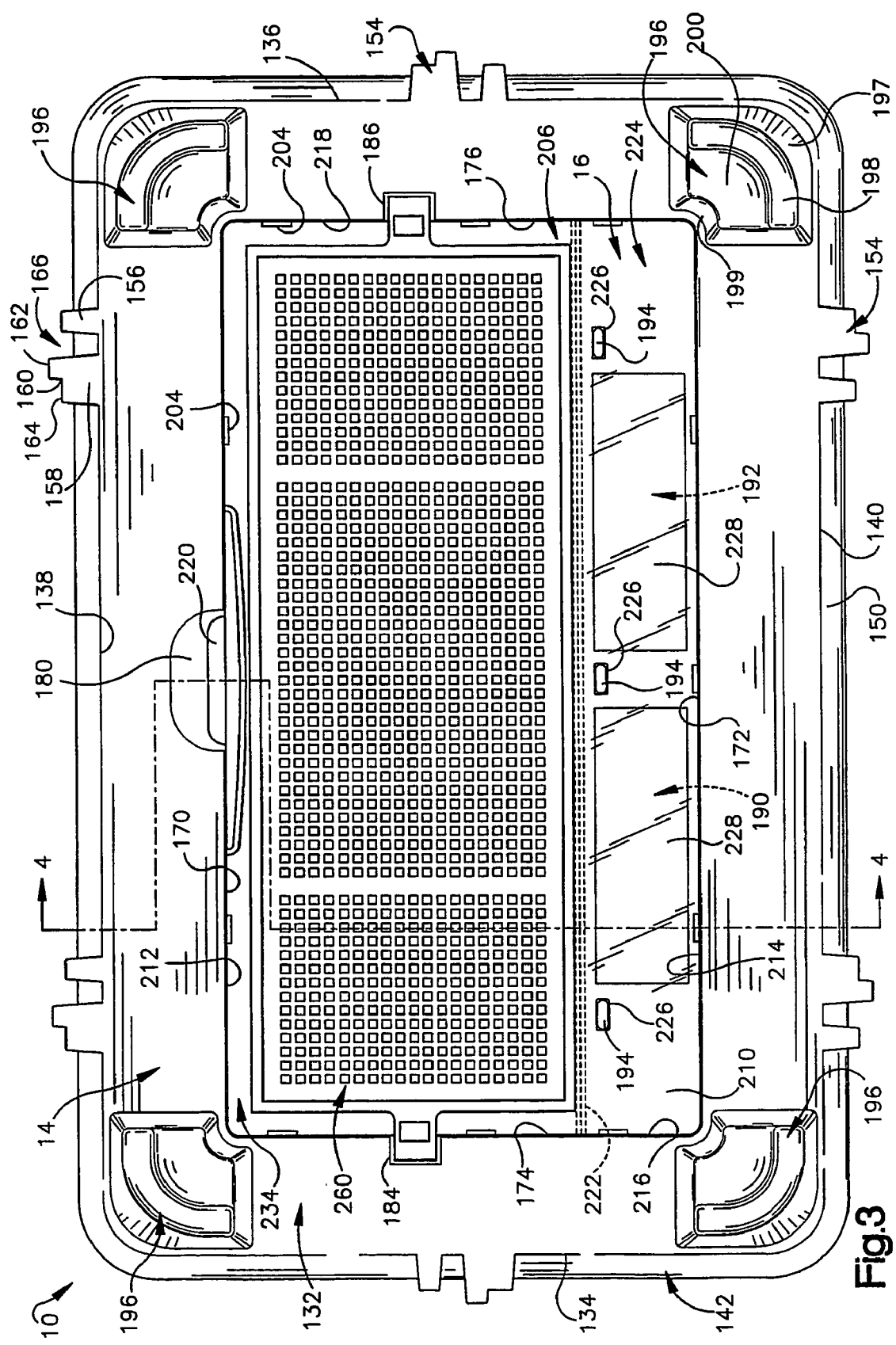
FIG. 3 is a plan view of the apparatus of FIG. 1.

As shown in FIG. 3, the cover piece 14 has a generally rectangular upper wall 132 with rounded corners. The upper wall 132 of the cover piece 14 is flat and is sized to cover the open top of the container 12. The upper wall 132 includes first and second end edges 134 and 136, respectively, and first and second side edges 138 and 140, respectively. The first and second end edges 134 and 136 have a width that is approximately equal to the distance between the outer walls 124 of the rim 120 adjacent the first and second side walls 24 and 26 of the container 12. The first and second side edges 138 and 140 of the upper wall 132 of the cover piece 14 have a length that is approximately equal to the distance between the outer walls 124 of the rim 120 adjacent the first and second end walls 20 and 22 of the container 12.

A rim 142 extends around an outer periphery of the cover piece 14. As shown in FIGS. 4 and 5, the rim 142 includes a leg 144 that curves away from the upper wall 132 to extend generally perpendicular to the upper wall. A flange 146 extends inwardly from the leg 144 in a direction parallel to and toward the upper wall 132 of the cover piece 14. An outer surface of the leg 144 defines an outer surface 150 (FIG. 3) of the rim 142.

A plurality of mating protrusions 154 (FIG. 3) that extends outwardly from the outer surface 150 of the rim 142. As illustrated with reference to one mating projection 154 in FIG. 3, each mating protrusion 154 includes first and second projections 156 and 158, respectively. The first projection 156 of each mating protrusion 154 extends outwardly of the outer surface 150 of the rim 142 by a first distance. The second projection 158 of the mating protrusion 154 includes a stepped outer surface 160. The stepped outer surface 160 has a first portion 162 that extends outwardly of the outer surface 150 of the rim 142 by a second distance, which is greater than the first distance. The stepped outer surface 160 of the second projection 158 also has a second portion 164, on an opposite side of the first portion 162 from the first projection 156 of the mating protrusion 154, which extends outwardly of the outer surface 150 of the rim 142 by the first distance. A space 166 separates the second projection 158 of the mating protrusion 154 from the first projection 156.

The cover piece 14 illustrated in FIG. 3 includes six mating protrusions 154. The portion of the rim 142 adjacent each of the first and second side edges 138 and 140 of the upper wall 132 of the cover piece 14 includes two mating protrusions 154 and the portion of the rim 142 adjacent each of the first and second end edges 134 and 136 of the upper wall 132 of the cover piece 14 includes one mating protrusion 154.

The upper wall 132 of the cover piece 14 also includes a centrally located and generally rectangular recess 168 (FIG. 2). First and second recess side walls 170 and 172 (FIG. 3), respectively, first and second recess end walls 174 and 176 (FIG. 3), respectively, and a recess bottom wall 178 (FIG. 4) define the recess 168. The recess 168 in the embodiment illustrated has a length of approximately seventy percent of the length of the upper wall 132 of the cover piece 14 and a width of approximately sixty percent of the width of the upper wall of the cover piece.

The recess bottom wall 178 extends parallel to the upper wall 132 of the cover piece 14. The first and second recess end walls 174 and 176 and the first and second recess side walls 170 and 172 connect the recess bottom wall 178 to the upper wall 132 of the cover piece 14. The first recess side wall 170 includes an outwardly extending arcuate groove 180 (FIGS. 4 and 5) in a location equidistant from the first and second recess end walls 174 and 176. An arcuate extension 182 (FIG. 5) of the recess bottom wall 178 extends into the arcuate groove 180. A first cutout 184 (FIG. 3) extends into the first recess end wall 174 and a second cutout 186 (FIG. 3) extends into the second recess end wall 176 in a location corresponding to the first cutout. The recess bottom wall 178 extends into the first and second recess cutouts 184 and 186.

The recess bottom wall 178 includes rectangular passage 188 (FIGS. 2 and 5). The rectangular passage 188 has a length of approximately ninety percent of the distance between the first and second recess end walls 174 and 176 and a width of approximately sixty-five percent of the distance between the first and second recess side walls 170 and 172. The passage 188 is centrally located between the first and second recess end walls 174 and 176 near the first recess side wall 170.

The recess bottom wall 178 also includes first and second viewing apertures 190 and 192 (FIG. 2), respectively. The first and second viewing apertures 190 and 192 align lengthwise with one another and are located near the second recess side wall 172. The first viewing aperture 190 is located nearer the first recess end wall 174 and the second viewing aperture 192 is located nearer the second recess end wall 176.

The recess bottom wall 178 also includes aligning pins 194 (FIG. 3). The aligning pins 194 project upwardly from the recess bottom wall 178. FIG. 3 shows the recess bottom wall 178 having three aligning pins 194, one located between the first recess end wall 174 and the first viewing aperture 190, one located between the first and second viewing apertures 190 and 192, and one located between the second viewing aperture 192 and the second recess end wall 176.

The upper wall 132 of the cover piece 14 also includes four stacking protrusions 196, as shown in FIG. 3. Each stacking protrusions 196 is located near a rounded corner of the upper wall 132 of the cover piece 14. Thus, as shown in FIG. 3, each rounded corner of the upper wall 132 of the cover piece 14 has an associated stacking protrusion 196. As shown with reference to one stacking protrusion 196 in FIG. 3, each stacking protrusions 196 includes an arcuate outer wall 197 that extends upwardly from the upper surface 132 of the cover piece 14. The arcuate outer wall 197 tapers inwardly, toward the recess 168 of the cover piece 14, as it extends upwardly from the upper wall 132, as shown in FIG. 4. The arcuate outer wall 197 terminates at an arcuate upper wall 198 (FIG. 3). The arcuate upper wall 198 extends approximately parallel to the upper wall 132 of the cover piece 14. Each stacking protrusion 196 also includes an arcuate inner wall 199 that extends upwardly from the upper wall 132 of the cover piece 14 approximately half the distance of the arcuate outer wall 197. The arcuate inner wall 199 tapers outwardly, away from the recess 168 in the cover piece 14, as it extends upwardly from the upper wall 132 of the cover piece 14. A horizontal support wall 200 (FIG. 3) extends outwardly from the arcuate inner wall 199 toward the arcuate outer wall 197 in a direction generally parallel to the upper wall 132 of the cover piece 14. A vertical support wall 201 (FIG. 4) connects the horizontal support wall 200 with the arcuate upper wall 198 of each stacking protrusion 196.

Each stacking protrusion 196 is open from an underside of the cover piece 14. Thus, when viewed from below, the four stacking protrusions 196 form pockets (not shown) on the underside of the cover piece 14. The pockets formed by the stacking protrusions 196 allow multiple cover pieces to be nested together. When nested together, the stacking protrusions 196 from one cover piece 14 are received in the pockets formed by the stacking protrusions of another cover piece. The ability of the cover piece 14 to nest allows multiple cover pieces to be sterilized at once, preferably, while nested.

The cover piece 14 is molded from a thermoplastic, preferably polypropylene. Preferably, the walls of the cover piece 14 are approximately two millimeters thick.

A plurality of tabs 204 extends outwardly of the recess end walls 174 and 176 and side walls 170 and 172 into the recess 168. Each of the first and second recess end walls 174 and 176 and the second recess side wall 172 includes three tabs 204. Each tab 204 is spaced from the other tabs 204. The first recess side wall 170 includes two tabs 204, spaced from one another.

As shown in FIG. 3, the closure piece 16 is rectangular and is sized to be received in the recess 168 in the cover piece 14 and to be secured within the recess by the tabs 204. The closure piece 16 includes an upper wall 206 having lower and upper surfaces 208 (FIG. 4) and 210, respectively. The upper wall 206 also includes first and second side edges 212 and 214, respectively, and first and second end edges 216 and 218, respectively. A handle 220 is located on the first side edge 212 of the closure piece 16 equidistance from the first and second end edges 216 and 218. As shown in FIG. 5, the handle 220 projects upwardly from the upper surface 210 of the upper wall 206 and slightly outwardly of the first side edge 212.

The upper wall 206 of the closure piece 16 also includes a hinge 222 that extends from the first end edge 216 to the second end edge 218 of the closure piece 16. As shown in FIG. 4, the hinge 222 is located on the lower surface 208 of the upper wall 206 and is a line where the upper wall 206 has a reduced thickness. The hinge 222 is located inward of the second side edge 214 of the upper wall 206 a distance of approximately twenty five percent of a width of the upper wall; i.e., the width of the upper wall 206 is the distance between the first and second side edges 212 and 214 of the upper wall. Thus, approximately seventy-five percent of the upper wall 206 extends between the hinge 222 and the handle 220 of the upper wall 206. The portion 224 of the upper wall 206 between the second side edge 214 and the hinge 222 includes three apertures 226 (FIG. 3) and two windows 228 (FIG. 3). Each one of the three apertures 226 is in a location corresponding to the location of an associated aligning pin 194 of the cover piece 14. Each of the three apertures 226 is sized for receiving an associated aligning pin 194. The two windows 228 are in locations corresponding to the viewing apertures 190 and 192 of the cover piece 14. The two windows 228 are formed from reduced thickness portions of the upper wall 206, as is shown in FIG. 4. The area of the two windows 228 is transparent.

The upper wall 206 of the closure piece 16 also includes first and second locking projections, a first 230 of which is shown in FIG. 2. The first locking projection 230 is located adjacent the first end edge 216 of the upper wall 206 in a position to be received by the first cutout 184 in the cover piece 14. The second locking projection is located adjacent the second end edge 218 of the upper wall 206 in a position to be received by the second cutout 186 in the cover piece 14. Each locking projection includes a locking portion for interlocking with cooperating locking projections.

A rectangular recess 232 (FIG. 4) extends into the upper wall 206 of the closure piece 16. The recess 232 is centrally located in the portion 234 of the upper wall 206 between the hinge 222 and the handle 220. The recess 232 has a length of approximately ninety percent of the length of the upper wall 206; i.e., the length of the upper wall 206 is the distance between the first and second end edges 216 and 218 of the upper wall. A recess bottom wall 236 extends parallel to the upper wall 206 and includes upper and lower surfaces (not indicated in the Figures). As shown in FIG. 5, the upper surface of the recess bottom wall 236 aligns with the lower surface 208 of the upper wall 206 of the closure piece 16.

As shown in FIGS. 4 and 5, a plurality of air passages 238 extends through the recess bottom wall 236 from the upper surface to the lower surface. Each of the plurality of air passages 238 is square and has dimensions of three millimeters by three millimeters. Approximately two millimeters separates each air passage 238 from each adjacent air passage 238.

The plurality of air passages 238 forms three separate arrays 240, 242 and 244 (FIG. 2). An inner array 240 of air passages 238 is centered within the recess 232 and extends over approximately forty percent of the length of the recess and approximately ninety percent of the width of the recess. A first outer array 242 is located in the recess bottom wall 236 on one side of the inner array 240 and a second outer array 244 is located in the recess bottom wall 236 on the opposite side of the inner array 240 from the first outer array 242. The first and second outer arrays 242 and 244 have widths that equal the width of the inner array 240 and lengths that are approximately one-half the length of the inner array 240.

The recess bottom wall 236 also includes first and second ribs 246 (FIG. 2). The first rib 246 separates the inner array 240 from the first outer array 242. The second rib 246 separates the inner array 240 from the second outer array 244. A frame 248 (FIG. 4) protrudes from the lower surface 208 of the upper wall 206 of the closure piece 16. The frame 248 surrounds the arrays of air passages 238.

The closure piece 16 is molded from a thermoplastic, preferably polypropylene. Preferably, the walls of the closure piece 16 are approximately two millimeters thick. The thickness of the upper wall 206 of the closure piece 16 in the location of the windows 228 is approximately one millimeter thick.

The apparatus 10 also includes three air filters 250, 252, and 254. Each air filter is formed from a spun polypropylene blend. A first air filter 252 is sized to be received in the frame 80 of the first side wall 24 of the container 12 and to overlie the air passages 70 within the first side wall. A second air filter 252 is sized to be received in the frame 108 of the second side wall 26 of the container 12 and to overlie the air passages 98 within the second side wall. The third air filter 254 is sized to be received in the recess 232 of the closure piece 16 and to overlie the air passages 238 within the recess bottom wall 236.

The apparatus 10 also include three filter guards 256, 258, and 260. Each filter guard is rectangular and includes and inner and an outer surface. A plurality of air passages 262 extends through each filter guard 256, 258, and 260. Each filter guard also includes two locking projections. One locking projection is centered on each short edge of the rectangular filter guard. Each locking projection includes a locking portion for interlocking with cooperating locking projections.

A first filter guard 256 is sized to overlie the frame 80 of the first side wall 24 of the container 12 such that the locking projections of the first filter guard 256 interlock with the locking projections of the first side wall 24. The plurality of air passages 262 in the first filter guard 256 are sized and arranged to correspond with the plurality of air passages 70 in the first side wall 24.

A second filter guard 258 is sized to overlie the frame 108 of the second side wall 26 of the container 12 such that the locking projections of the second filter guard 258 interlock with the locking projections 110 of the second side wall 26. The plurality of air passages 262 in the second filter guard 258 are sized and arranged to correspond with the plurality of air passages 98 in the second side wall 26.

A third filter guard 260 is sized to overlie the recess 232 of the closure piece 16 such that the locking projections of the third filter guard 260 interlock with the locking projections 230 of the upper wall 206 of the closure piece 16. The plurality of air passages 262 in the third filter guard 260 are sized and arranged to correspond with the plurality of air passages 238 in the recess bottom wall 236 of the closure piece 16.

The apparatus 10 may also include one or more dividers 264. Each divider 264 is received in the container 12 to divide the cavity 28 into compartments. FIG. 6 illustrates one divider 264 that is received in the container 12 and that divides the cavity into first and second compartments 266 and 268, respectively. As shown in FIG. 2, the divider 264 has a generally trapezoidal shape and includes parallel lower and upper edges and angled first and second side edges. The divider 264 is sized to extend snugly between the first and second side walls 24 and 26 of the container 12 and to extend from the bottom wall 18 to the open top of the container 12. The upper edge of the divider 264 includes cutouts that receive portions of the cover piece 14 and the closure piece 16. The divider 264 also includes two extensions 270. A first extension 270 extends outwardly of the first side edge of the divider 264 adjacent an upper edge of the divider. The second extension 270 extends outwardly of the second side edge of the divider 264 adjacent the upper edge of the divider.

An example method for assembling the apparatus 10 is set forth below. It should be recognized that the method of assembly may be altered from that described. Particularly, the order of assembly may be altered.

To assemble the apparatus 10, the first and second filters 250 and 252 are heat welded over the air passages 70 and 98 in the container 12. When heat welded to the first side wall 24 of the container 12, the first filter 250 becomes fixedly attached to the portion of the first side wall 24 between the frame 80 and the arrays 72, 74, and 76 of air passages 70. The first filter 250 also becomes fixedly attached to the vertical ribs 78 that separate the arrays of air passages 70. Similarly, when heat welded to the second side wall 26 of the container 12, the second filter 252 becomes fixedly attached to the portion of the second side wall 26 between the frame 108 and the arrays 100, 102, and 104 of air passages 98. The second filter 252 also becomes fixedly attached to the vertical ribs 106 that separate the arrays of air passages 98.

After the first and second filters 250 and 252 are heat welded to the container 12, the first and second filter guards 256 and 258 are attached to the container 12. An outer periphery of the first filter guard 256 lies against the frame 80 of the first side wall 24 of the container 12 and the locking projections of the first filter guard 256 interlock with the locking projections of the first side wall 24. Similarly, the second filter guard 258 lies against the frame 108 of the second side wall 26 of the container 12 and the locking projections of the second filter guard 258 interlock with the locking projections 110 of the second side wall 26. The first and second filter guards 256 and 258 protect the first and second filters 250 and 252, respectively, from animals located outside of the container 12.

Next, the divider 264, if use of a divider is desired, is placed in the cavity 28 of the container 12. When received in the container 12, a lower edge of the divider 264 is received in the slot 44 formed by the pair of indexing projections 38 on the bottom wall 18 of the container 12. The first and second extensions 270 of the divider 264 are received in the slots 130 formed in the rim 120 of the container 12. The pair of indexing projections 38 and the rim 120 prevent movement of the divider 264 relative to the container 12 when the divider is received in the associated slots 44 and 130.

The third filter 254 is then heat welded in the recess 232 of the closure piece 16. When heat welded in the recess 232 of the closure piece 16, the third filter 254 becomes fixedly attached to the periphery of the recess bottom wall 236 and to the ribs 246 that separate the arrays 240, 242, and 244 of air passages 238 in the closure piece 16.

The closure piece 16 is then inserted into the recess 168 of the cover piece 14. To properly align the closure piece 16 relative to the cover piece 14, each aperture 226 in the closure piece 16 receives an associated aligning pin 194 of the cover piece 14. The closure piece 16 is then forced downwardly into the recess 168 of the cover piece 14. When forced into the recess 168 of the cover piece 14, the tabs 204 on the cover piece 14 deform and then snap over the upper surface 210 of the upper wall 206 of the closure piece 16. As a result, the tabs 204 secure the closure piece 16 relative to the cover piece 14.

When the closure piece 16 is secured in the recess 168 of the cover piece 14, the windows 228 of the closure piece 16 overlie the viewing apertures 190 and 192 of the cover piece 14 and allow sight into the cavity 28 of container 12. Also, when the closure piece 16 is secured in the recess 168 of the cover piece 14, the handle 220 of the closure piece 16 is located in the arcuate groove 180 of the cover piece 14. The arcuate groove 180 provides access to the handle 220. It should be noted that when the closure piece 16 is properly secured relative to the cover piece 14, a seal is formed between the lower surface 208 of the upper wall 206 of the closure piece 16 and the recess bottom wall 178 of the cover piece 14. This seal prevents airflow between the cover piece 14 and the closure piece 16.

Next, the third filter guard 260 is secured over the third filter 254. The third filter guard 260 overlies the recess 232 of the closure piece 16. The locking projections of the third filter guard interlock with the locking projections 230 of the upper wall 206 of the closure piece 16 to secure the third filter guard 260 relative to the closure piece 16. The third filter guard 260 protects the third filter 254 from animals located outside of the apparatus 10.

The cover piece 14 is then attached to the rim 120 of the container 12. The cover piece 14 is pressed onto the container 12 such that the flange 146 of the leg 144 of the rim 142 of the cover piece 14 snaps around and locks under lower wall 126 of the rim 120 of the container 12.

The apparatus 10 of the present invention is used for transporting laboratory animals. During transportation of the laboratory animals, a bedding, typically a sawdust bedding 272 as shown in FIG. 6, is provided in each compartment 266 and 268 of the container 12. Also, a food and water source, indicated at 274 in FIG. 6, is also provided in each compartment 266 and 268.

When the handle 220 of the closure piece 16 is pulled upwardly as viewed in FIG. 4, the portion 234 of the closure piece 16 between the handle 220 and the hinge 222 snaps over the tabs 204 of the cover piece 14 and rotates from a closed position, shown in FIG. 4 by solid lines, to an open position, as shown in FIG. 5. During such rotation, the remaining portion 224 of the closure piece 16 remains secured relative to the cover piece 14.

When the rotatable portion 234 of the closure piece 16 is in an open position, one or more laboratory animal may be inserted into or extracted from the apparatus 10. During insertion or extraction, the laboratory animals pass through the passage 188 of the cover piece 14 and into one of the compartments 266 and 268 within the cavity 28 of the container 12 of the apparatus 10.

To retain a laboratory animal within the apparatus 10, the rotatable portion 234 of the closure piece 16 is rotated back to the closed position. During the transition between the open and closed positions, the portion 234 of the closure piece 16 snaps over the tabs 204 in the cover piece 14. The tabs 204 in the cover piece 14 secure the rotatable portion 234 of the closure piece 16 in the closed position.

A plurality of laboratory animals may be transported in one apparatus 10. The divider 264 may be used to compartmentalize the cavity within the container 12 to segregate laboratory animals from one another. When the divider 264 is used, sight is provided into each compartment 266 and 268 through one of the windows 228 in the closure piece 16 and the associated viewing aperture 190 and 192 of the cover piece 14. Airflow into and out of the apparatus 10 is provided through the plurality of air passages 70, 98, and 238 in the side walls 24 and 26 of the container 12 and in the closure piece 16. Since filters 250, 252, and 254 cover all of the air passages 70, 98, and 238, airflow into the cavity 28 is filtered of contaminants.

The apparatus 10 of the present invention has been designed to cooperate with similar apparatuses for the transport of large numbers of laboratory animals using multiple apparatuses. The apparatus 10 includes features that enable the apparatus 10 to be placed in a stacked relationship, in a side-by-side relationship, and in an end-by-end relationship with other similar apparatuses.

Figure 7:
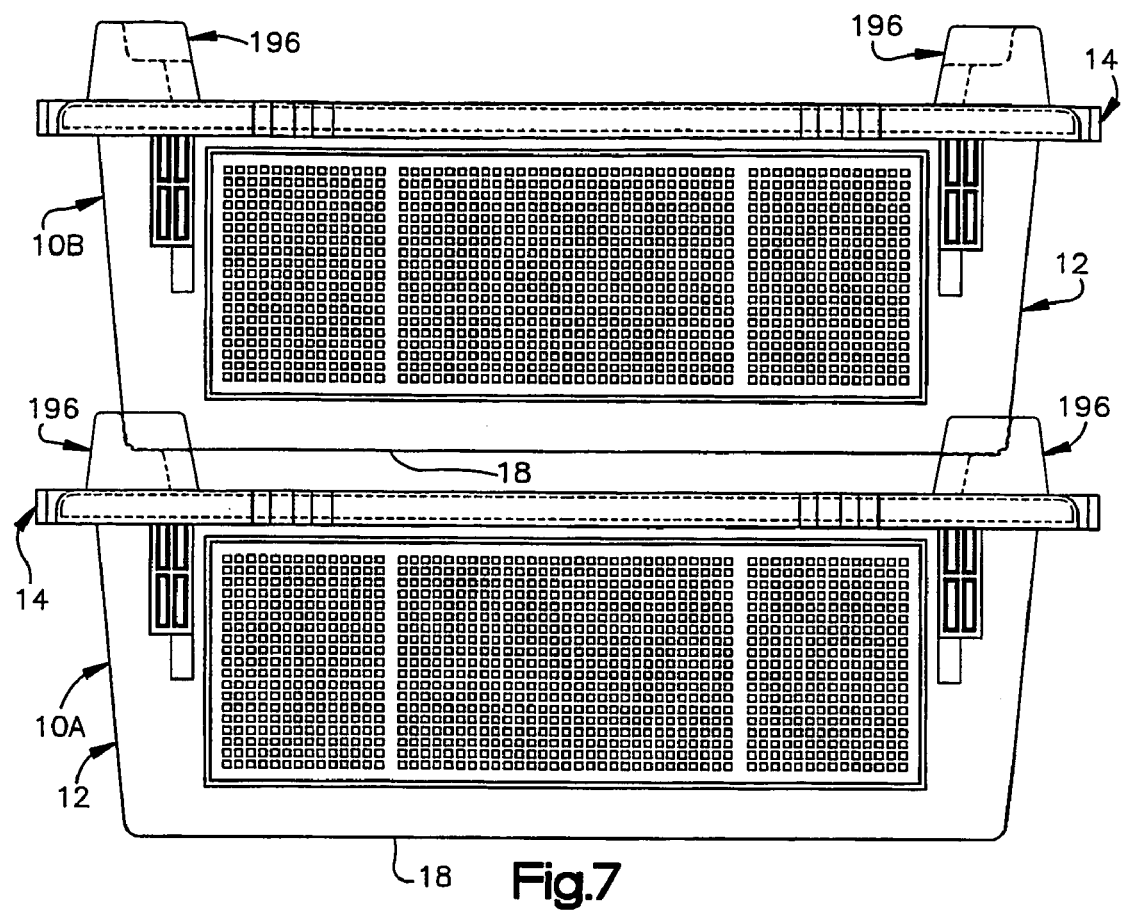
FIG. 7 illustrates first and second apparatuses, each constructed in accordance with the present invention, in a stacked relationship.

To enable stacking of multiple apparatuses, the stacking protrusions 196 of the cover piece 14 are arranged so as to be capable of receiving the bottom wall 18 of the container 12. Thus, as shown in FIG. 7, the stacking protrusions 196 of a first apparatus 10A may be used to support a second apparatus 10B. When supported by the stacking protrusions 196 of the first apparatus 10A, the bottom wall 18 of the second apparatus 10B rests on the horizontal support wall 200 of the stacking protrusions 196 of the first apparatus 10A. As a result, the bottom wall 18 of the container 12 of the second apparatus 10B is spaced from the upper wall of the cover piece 14 of the first apparatus 10A. This allows air to flow through the air passages in the closure piece of the first apparatus 10A. Additionally, the vertical support walls 201 of the stacking protrusions 196 of the first apparatus 10A prevent movement of the second apparatus 10B in a horizontal direction, i.e., parallel to the bottom wall 18 of the second apparatus 10B.

Figure 8:
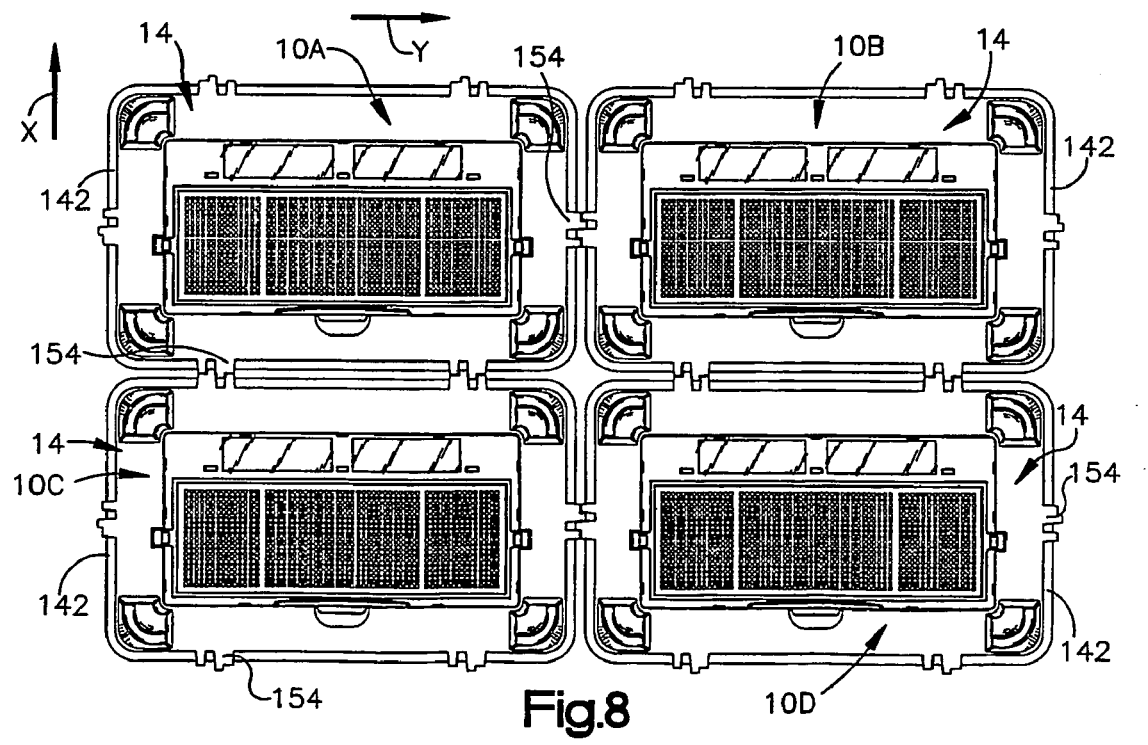
FIG. 8 illustrates multiple apparatuses, each constructed in accordance with the present invention, in a side-by-side and end-by-end relationship.

To enable side-by-side or end-by-end connection of adjacent apparatuses, the mating protrusions 154 on the rim 142 of the cover piece 14 of the apparatus 10 may be interlocked with corresponding mating protrusions 154 of an adjacent apparatus 10. For example, as shown in FIG. 8, a top view of four apparatuses 10A, 10B, 10C, and 10D is shown. The apparatuses 10A-D are connected both side-by-side and end-by-end. The mating protrusions 154 of each cover piece 14 interlock with the mating protrusions 154 of an adjacent cover piece 14. When interlocked, the first portion of the second projection of each mating protrusion 154 is received in the space between the first and second projections of a corresponding mating protrusion 154. With reference to FIG. 8, a mating protrusion 154 of apparatus 10B prevents apparatus 10A from moving in the direction indicated by arrow X. Two mating protrusions 154 of apparatus 10C prevent apparatus 10A from moving in the direction indicated by arrow Y. It should be noted that when positioned side-by-side and end-by-end, the side walls of the containers of the adjacent apparatuses are separated from one another for enabling airflow into and out of the cavity of each apparatus through the side walls of the container of the apparatus.

Figure 9:
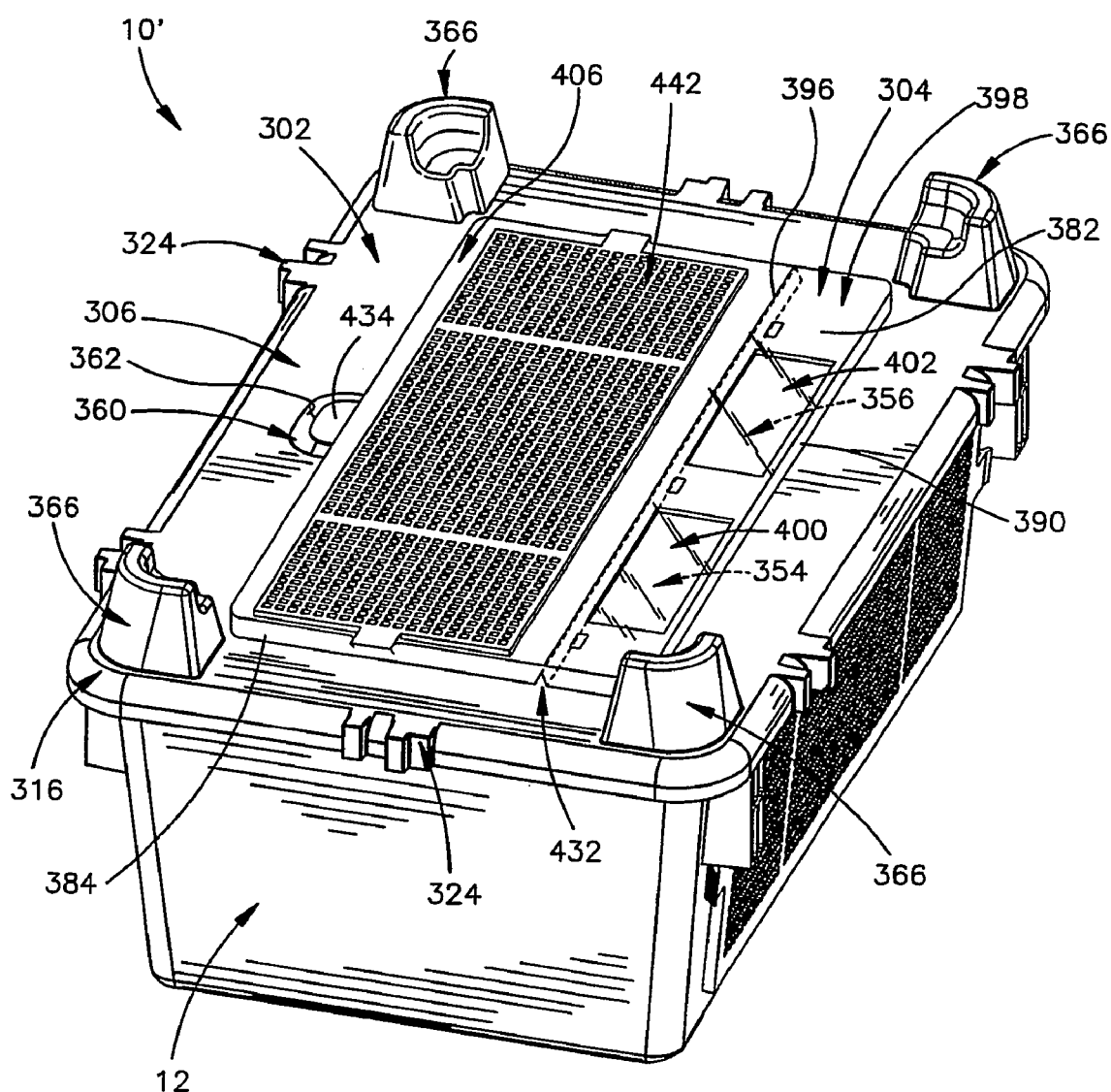
FIG. 9 is a perspective view of an apparatus constructed in accordance with a second embodiment of the present invention.

FIG. 9 is a perspective view of an apparatus 10' constructed in accordance with a second embodiment of the present invention. The apparatus 10' is a transport device for transporting at least one laboratory animal, such as a rodent. The apparatus 10' includes a container 12, a cover piece 302, and a closure piece 304. The container 12 of the apparatus 10' of the second embodiment of the present invention has an identical construction as the container 12 illustrated and discussed with regard to FIGS. 1–6. Therefore, the specific structures of the container 12 will not be discussed in detail with regard to apparatus 10' and the same reference numbers as were used in FIGS. 1–6 are used for identifying the structures of the container 12 of apparatus 10'.

Figure 11:
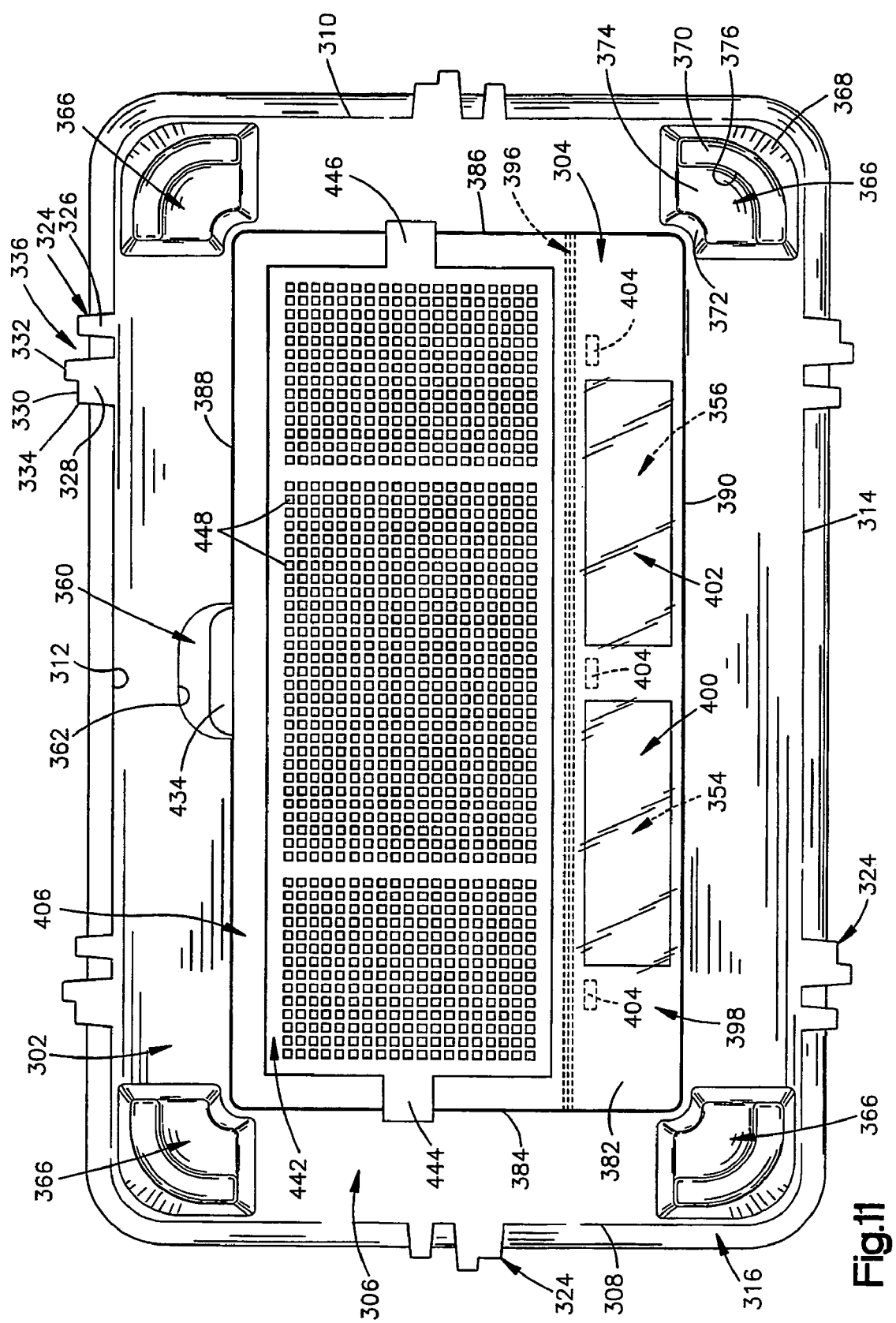
FIG. 11 is a plan view of the apparatus of FIG. 9.

As shown in FIG. 11, the cover piece 302 of apparatus 10' has a generally rectangular upper wall 306 with rounded corners. The upper wall 306 of the cover piece 302 is flat and is sized to cover the open top of the container 12. The upper wall 306 includes first and second end edges 308 and 310, respectively, and first and second side edges 312 and 314, respectively.

Figure 12:
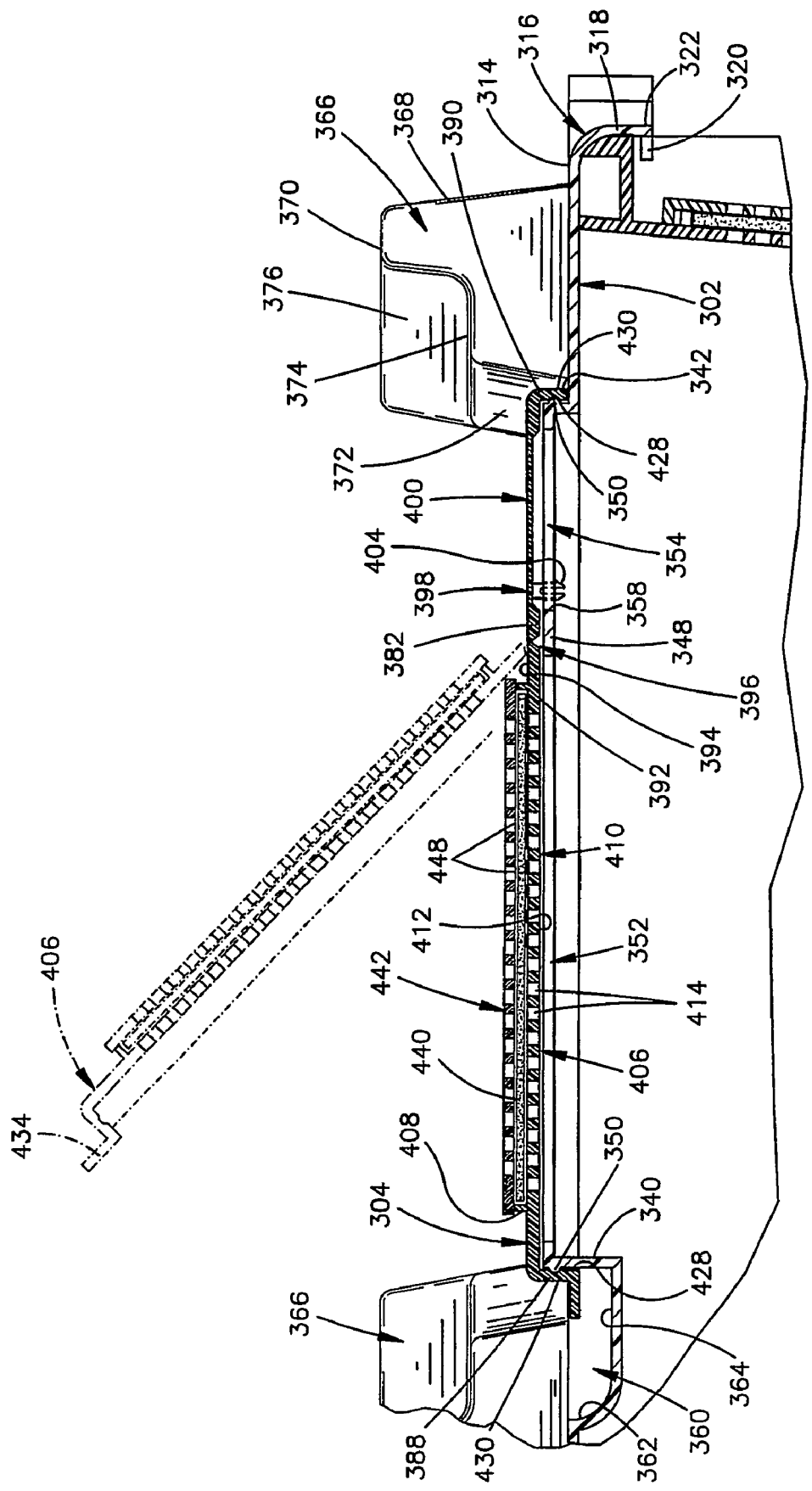
FIG. 12 is an enlarged view of a portion of the apparatus of FIG. 9.

A rim 316 extends around an outer periphery of the cover piece 302. As shown in FIG. 12, the rim 316 includes a leg 318 that curves away from the upper wall 306 to extend generally perpendicular to the upper wall. A flange 320 extends inwardly from the leg 318 in a direction parallel to and toward the upper wall 306 of the cover piece 302. An outer surface of the leg 318 defines an outer surface 322 (FIG. 11) of the rim 316.

A plurality of mating protrusions 324 (FIG. 11) extends outwardly from the outer surface of the rim 316. As illustrated with reference to one mating projection in FIG. 11, each mating protrusion 324 includes first and second projections 326 and 328, respectively. The first projection 326 of each mating protrusion 324 extends outwardly of the outer surface of the rim 316 by a first distance. The second projection 328 of the mating protrusion 324 includes a stepped outer surface 330. The stepped outer surface 330 has a first portion 332 that extends outwardly of the outer surface 322 of the rim 316 by a second distance, which is greater than the first distance. The stepped outer surface 330 of the second projection 328 also has a second portion 334, on an opposite side of the first portion 332 from the first projection 326 of the mating protrusion 324, which extends outwardly of the outer surface 322 of the rim 316 by the first distance. A space 336 separates the second projection 328 of the mating protrusion 324 from the first projection 326.

The cover piece 302 illustrated in FIG. 11 includes six mating protrusions 324. The portion of the rim 316 adjacent each of the first and second side edges 312 and 314 of the upper wall 306 of the cover piece 302 includes two mating protrusions 324 and the portion of the rim 316 adjacent each of the first and second end edges 308 and 310 of the upper wall 306 of the cover piece 302 includes one mating protrusion 324.

Figure 10:
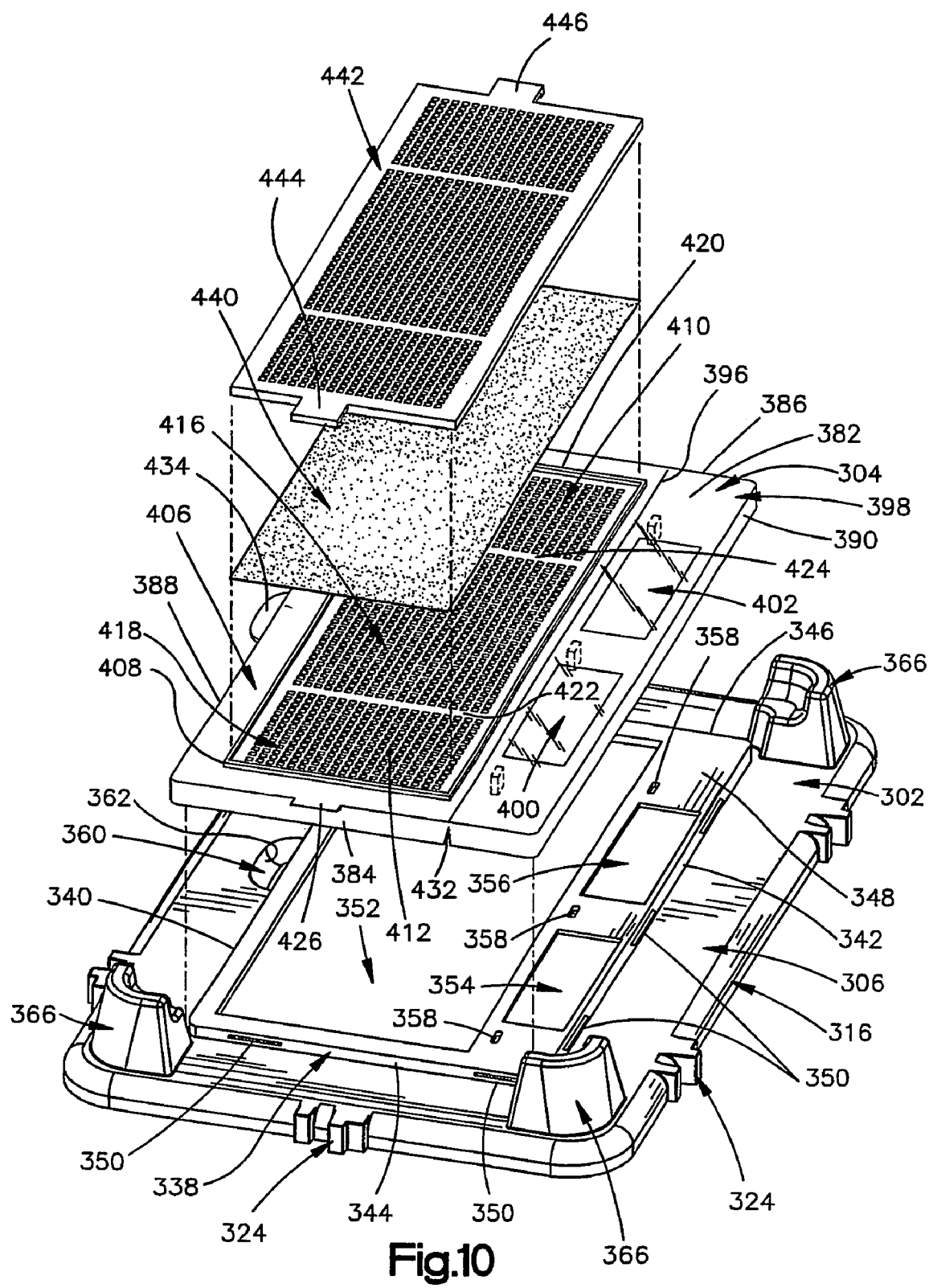
FIG. 10 is a perspective exploded view of a portion of the apparatus of FIG. 9.

The upper wall 306 of the cover piece 302 also includes a centrally located and generally rectangular protuberance 338 (FIG. 10). First and second protuberance side walls 340 and 342 (FIG. 10), respectively, first and second protuberance end walls 344 and 346 (FIG. 11), respectively, and a protuberance upper wall 348 (FIG. 10) define the protuberance 338. The protuberance 338 of the cover piece 302 in the embodiment illustrated in FIG. 10 has a length of approximately seventy percent of the length of the upper wall 306 of the cover piece 302 and a width of approximately sixty percent of the width of the upper wall 306 of the cover piece 302.

The protuberance upper wall 348 extends parallel to the upper wall 306 of the cover piece 302. The first and second protuberance end walls 344 and 346 and the first and second protuberance side walls 340 and 342 connect the protuberance upper wall 348 to the upper wall 306 of the cover piece 302. A plurality of tabs 350 extends outwardly each of the first and second protuberance end walls 344 and 346 and first and second protuberance side walls 342 and 344.

The protuberance upper wall 348 includes a rectangular passage 352 (FIGS. 10 and 12). The rectangular passage 352 has a length of approximately ninety percent of the distance between the first and second protuberance end walls 344 and 346 and a width of approximately sixty-five percent of the distance between the first and second protuberance side walls 340 and 342. The passage 352 is centrally located between the first and second protuberance end walls 344 and 346 near the first protuberance side wall 340.

The protuberance upper wall 348 also includes first and second viewing apertures 354 and 356 (FIG. 10), respectively. The first and second viewing apertures 354 and 356 align lengthwise with one another and are located near the second protuberance side wall 342. The first viewing aperture 354 is located nearer the first protuberance end wall 344 and the second viewing aperture 356 is located nearer the second protuberance end wall 346.

The protuberance upper wall 348 also includes three apertures 358 (FIG. 10). A first aperture 358 is located between the first protuberance end wall 344 and the first viewing aperture 354. A second aperture 358 is located between the first and second viewing apertures 354 and 356 and a third aperture 358 is located between the second viewing aperture 356 and the second protuberance end wall 346.

A recess 360 extends into the upper wall 306 of the cover piece 302 adjacent the first protuberance side wall 340. The recess 360 is located equidistance from the first and second protuberance end walls 344 and 346. The first protuberance side wall 340, an arcuate side wall 362, and a recess bottom wall 364 (FIG. 12) define the recess 360.

The upper wall 306 of the cover piece 302 also includes four stacking protrusions 366, as shown in FIG. 11. Each stacking protrusions 366 is located near a rounded corner of the upper wall 306 of the cover piece 302. Thus, as shown in FIG. 11, each rounded corner of the upper wall 306 of the cover piece 302 has an associated stacking protrusion 366. As shown with reference to one stacking protrusion 366 in FIG. 11, each stacking protrusion includes an arcuate outer wall 368 that extends upwardly from the upper surface 306 of the cover piece 302. The arcuate outer wall 368 tapers inwardly, toward the protuberance 338 of the cover piece 302, as it extends upwardly from the upper wall 306, as shown in FIG. 12. The arcuate outer wall 368 terminates at an arcuate upper wall 370 (FIG. 11). The arcuate upper wall 370 extends approximately parallel to the upper wall 306 of the cover piece 302.

Each stacking protrusion 366 also includes an arcuate inner wall 372 that extends upwardly from the upper wall 306 of the cover piece 302 approximately half the distance of the arcuate outer wall 368. The arcuate inner wall 372 tapers outwardly, away from the protuberance 338 in the cover piece 302, as it extends upwardly from the upper wall 306 of the cover piece 302. A horizontal support wall 374 (FIG. 11) extends outwardly from the arcuate inner wall 372 toward the arcuate outer wall 368 in a direction generally parallel to the upper wall 306 of the cover piece 302. As shown in FIG. 12, the horizontal support wall 374 is located higher above the upper wall 306 of the cover piece 302 than the protuberance upper wall 348. A vertical support wall 376 (FIG. 12) connects the horizontal support wall 374 with the arcuate upper wall 370 of each stacking protrusion 366.

Each stacking protrusion 366 is open from an underside of the cover piece 302. Thus, when viewed from below, the four stacking protrusions 366 form pockets (not shown) on the underside of the cover piece 302. The pockets formed by the stacking protrusions 366 allow multiple cover pieces to be nested together. When nested together, the stacking protrusions 366 from one cover piece 302 are received in the pockets formed by the stacking protrusions 366 of another cover piece 302. The ability of the cover piece 302 to nest allows multiple cover pieces to be sterilized at once, preferably, while nested.

As shown in FIG. 11, the closure piece 304 is rectangular and is sized to overlie the protuberance 338 in the cover piece 302 and to be secured relative to the protuberance. The closure piece 304 includes an upper wall 382, first and second end walls 384 and 386, respectively, and first and second side walls 388 and 390, respectively. A length of the closure piece 304 is defined between the first and second end walls 384 and 386 and a width of the closure piece 304 is defined between the first and second side walls 388 and 390.

The upper wall 382 of the closure piece 304 has lower and upper surfaces 392 and 394 (FIG. 12), respectively. The upper wall 382 of the closure piece 302 also includes a hinge 396 that extends linearly across the length of the closure piece 304. As shown in FIG. 12, the hinge 396 is formed on the lower surface 392 of the upper wall 382 and is defined by a reduced thickness of the upper wall 382. The hinge 396 is located inward of the second side wall 390 of the closure piece 304 a distance of approximately twenty five percent of the width of the closure piece 304. Thus, approximately seventy-five percent of the upper wall 382 extends between the hinge 396 and the first side wall 388 of the closure piece 304.

A portion 398 of the upper wall 382 of the closure piece 304 between the second side wall 390 and the hinge 396 includes two windows 400 and 402 (FIG. 11). The two windows 400 and 402 are formed from reduced thickness portions of the upper wall 382, as is shown in FIG. 12. The area of the two windows 400 and 402 is transparent. The two windows 400 and 402 are in locations corresponding to the viewing apertures 354 and 356, respectively, of the cover piece 302.

The portion 398 of the upper wall 382 also includes three aligning pins 404 (FIG. 11). Each of the three aligning pins 404 extends downwardly from the lower surface 392 of the upper wall 382 in a location corresponding to the location of an aperture 358 of the cover piece 302. Each of the three aligning pins 404 is adapted to be received in an associated one of the apertures 358 of the cover piece 302.

A portion 406 of the upper wall 382 of the closure piece 304 between the second side wall 390 and the hinge 396 includes a raised ridge 408 that extends upwardly from the upper wall 382. The raised ridge 408 outlines a centrally located area 410 of the portion 406 of the upper wall 382. The area 410 has a length of approximately ninety percent of the length of the upper wall 382. The area 410 includes a wall 412 that extends parallel to and is planar with the upper wall 382 of the closure piece 304. As shown in FIG. 12, a plurality of air passages 414 extends through the wall 412. Each of the plurality of air passages 414 is square and has dimensions of three millimeters by three millimeters. Approximately two millimeters separates each air passage 414 from each adjacent air passage 414.

The plurality of air passages 414 forms three separate arrays 416, 418, and 420 (FIG. 10). An inner array 416 of air passages 414 is centered within the area 410 and extends over approximately forty percent of the length of the area 410 and approximately ninety percent of the width of the area 410. A first outer array 418 is located in the wall 412 on one side of the inner array 416 and a second outer array 420 is located in the wall 412 on the opposite side of the inner array 416 from the first outer array 418. The first and second outer arrays 418 and 420 have widths that equal the width of the inner array 416 and lengths that are approximately one-half the length of the inner array 416.

The wall 412 includes first and second ribs 422 and 424 (FIG. 10), respectively. The first rib 422 separates the inner array 416 from the first outer array 418. The second rib 424 separates the inner array 416 from the second outer array 420.

The upper wall 382 of the closure piece 304 also includes first and second locking projections. The first locking projection 426 is shown in FIG. 10 and is centrally located on the upper wall 382 adjacent the first end wall 384 of the closure piece 304. The first locking projection 426 extends outwardly beyond the first end wall 384 of the closure piece 304. The second locking projection (not shown) is centrally located on the upper wall 382 adjacent the second end wall 386 of the closure piece 304. The second locking projection extends outwardly beyond the second end wall 386 of the closure piece 304.

The first and second end walls 384 and 386 and the first and second side walls 388 and 390 of the closure piece 304 extend perpendicularly to the upper wall 382 of the closure piece 304. Opposite ends of the first and second end walls 384 and 386 and opposite ends of the first and second side walls 388 and 390 are curved so that each intersection of an end wall and a side wall is rounded to correspond with a rounded corner of the upper wall 382.

Each of the first and second end walls 384 and 386 of the closure piece 304 includes an inner surface 384 (FIG. 12) and an outer surface 430. A cutout 432 (FIG. 9) extends through each of the first and the second end walls 384 and 386 in a location corresponding to the hinge 396 on the upper surface 382 of the closure piece 304. The cutouts 432 enable pivotal movement of portion 406 of the upper wall 382 about the hinge 396 and relative to portion 398 of the closure piece 304.

The inner surface 328 of each of the first and second end walls 384 and 386 of the closure piece 304 includes a plurality of inwardly grooves. FIG. 12 illustrates one groove in the inner surface 428 of each of the first and second end walls 384 and 386. At least one groove is located on each side of the cutout 432 in each of the first and second end walls 384 and 386. Each groove of the plurality of grooves on the first and second end walls 384 and 386 is associated with a tab 350 in the first and second protuberance end walls 344 and 346 and is adapted to receive the associated tab 350 for securing the closure piece 304 relative to the cover piece 302.

Each of the first and second side walls 388 and 390 of the closure piece 304 includes an inner surface and an outer surface. The inner surface of each of the first and second side walls 388 and 390 includes a plurality of grooves (not shown), which are similar to the grooves on the inner surface 428 of the first and second end walls 384 and 386. Each groove of the plurality of grooves in the first and second side walls 388 and 390 is associated with a tab 350 on the first and second protuberance side walls 340 and 342 and is adapted to receive the associated tab 350 for securing the closure piece 304 relative to the cover piece 302.

A handle 434 extends outwardly from a lower edge of the first side wall 388 of the closure piece 304 at a location centrally located between the first and second end walls 384 and 386. When the closure piece 304 is secured to the cover piece 302, the handle 434 extends into the recess 360 of the cover piece 302 a spaced distance away from the recess bottom wall 364.

The apparatus 10' also includes air filters and filter guards. The air filters and filter guards for the container 12 are identical to those discussed above with reference to FIGS. 1–6. Thus, the air filters and filter guards for the container 12 are not discussed in detail hereinafter.

Air filter 440 is sized to be received in the area 410 outlined by the raised ridge 408 of the closure piece 304 and to overlie the air passages 414 that extend through wall 412. Filter guard 442 is sized to cover the area 410 of the closure piece 304 and to overlie raised ridge 408. The filter guard 442 includes first and second locking projections 444 and 446, respectively, each of which is adapted to interlock with an associated locking projection 426 of the closure piece 304 to secure the filter guard 442 relative to the closure piece 304 for covering the filter 440. Filter guard 442 also includes a plurality of air passages 448. The plurality of air passages 448 in the filter guard 442 are sized and arranged to correspond with the plurality of air passages 414 in the wall 412 of the closure piece 304.

The container 12 of the apparatus 10' is assembled in the same manner as described above with reference to FIGS. 1–6. Thus, the assembly of the container 12 is not discussed below.

The filter 440 is heat welded to the upper surface of the wall 412 in the area outlined by raised ridge 408 of the closure piece 304. When heat welded to the wall 412, the filter 440 becomes fixedly attached to the periphery of the wall 412 and to the ribs 422 and 424 that separate the arrays 416, 418, and 420 of air passages 414 in the closure piece 304.

To attach the closure piece 304 to the cover piece 302, the closure piece 304 is positioned over the protuberance 338 of the cover piece 302. To properly align the closure piece 304 relative to the cover piece 302, each aligning pin 404 of the closure piece 304 is received in an associated aperture 358 of the cover piece 302. The closure piece 304 is then forced downwardly until the grooves in the inner surfaces 428 of the first and second end walls 384 and 386 and the grooves in the inner surfaces of the first and second side walls 388 and 390 receive associated tabs 350 of the first and second end walls 344 and 346 and first and second side walls 340 and 342 of the protuberance 338. When the tabs 350 of the cover piece 302 snap into the grooves of the closure piece 304, the closure piece 304 becomes secured to the cover piece 302.

When the closure piece 304 is secured to the cover piece 302, the windows 400 and 402 of the closure piece 304 overlie the viewing apertures 354 and 356 of the cover piece 302 and allow sight into the cavity 28 of container 12. Also, when the closure piece 304 is secured to the cover piece 302, the handle 434 of the closure piece 304 is located in the recess 360 of the cover piece 302. The end walls 384 and 386 and the side walls 388 and 390 of the closure piece 304 act as flashing and overlie associated end walls 344 and 346 and side walls 340 and 342 of the protuberance 338 of the cover piece 302 to form a seal between the closure piece 304 and the cover piece 302.

Next, the filter guard 442 is secured over the filter 440. The filter guard 442 overlies the raised ridge 408 of the closure piece 304 and the locking projections 444 and 446 of the filter guard 442 interlock with the locking projections 426 of the upper wall 382 of the closure piece 304. When secured over filter 440, the filter guard 442 protects the filter 440 from animals located outside of the apparatus 10'.

The cover piece 302 is then attached to the rim 120 of the container 12. The cover piece 302 is pressed onto the container 12 such that the flange 320 of the leg 318 of the rim 316 of the cover piece 302 snaps around and locks under lower wall 126 of the rim 120 of the container 12.

When the handle 434 of the closure piece 304 is pulled upwardly, as viewed in FIG. 12, the portion 406 of the closure piece 304 between the handle 434 and the hinge 396 snaps away from the cover piece 302 and rotates from a closed position, shown in FIG. 12 by solid lines, to an open position, as shown in FIG. 12 by dashed lines. During rotation of portion 406, portion 398 of the closure piece 304 remains secured relative to the cover piece 302.

When the rotatable portion 406 of the closure piece 304 is in an open position, one or more laboratory animal may be inserted into or extracted from the apparatus 10'. During insertion or extraction, the laboratory animals pass through the passage 352 of the cover piece 302 and into one of the compartments 266 and 268 within the cavity 28 of the container 12 of the apparatus 10'.

To retain a laboratory animal within the apparatus 10', the rotatable portion 406 of the closure piece 304 is rotated back to the closed position. During the transition between the open and closed positions, the portion 406 of the closure piece 304 snaps onto the cover piece 302.

A plurality of laboratory animals may be transported in one apparatus 10'. A divider may be used to compartmentalize the cavity 28 within the container 12 to segregate laboratory animals from one another. When a divider is used, sight is provided into each compartment 266 and 268 of the container 12 through one of the windows 400 and 402 in the closure piece 304 and the associated viewing aperture 354 and 356 of the cover piece 302. Airflow into and out of the apparatus 10' is provided through the plurality of air passages 70 and 98 in the side walls 24 and 26 of the container 12 and the air passages 414 in the closure piece 304. Since filters 250, 252, and 440 cover all of the air passages 70, 98, and 414, airflow into the cavity 28 is filtered of contaminants.

The apparatus 10' has been designed to cooperate with similar apparatuses for the transport of large numbers of laboratory animals using multiple apparatuses. The apparatus 10' includes features that enable the apparatus 10' to be placed in a stacked relationship, in a side-by-side relationship, and in an end-by-end relationship with other similar apparatuses.

Figure 13:
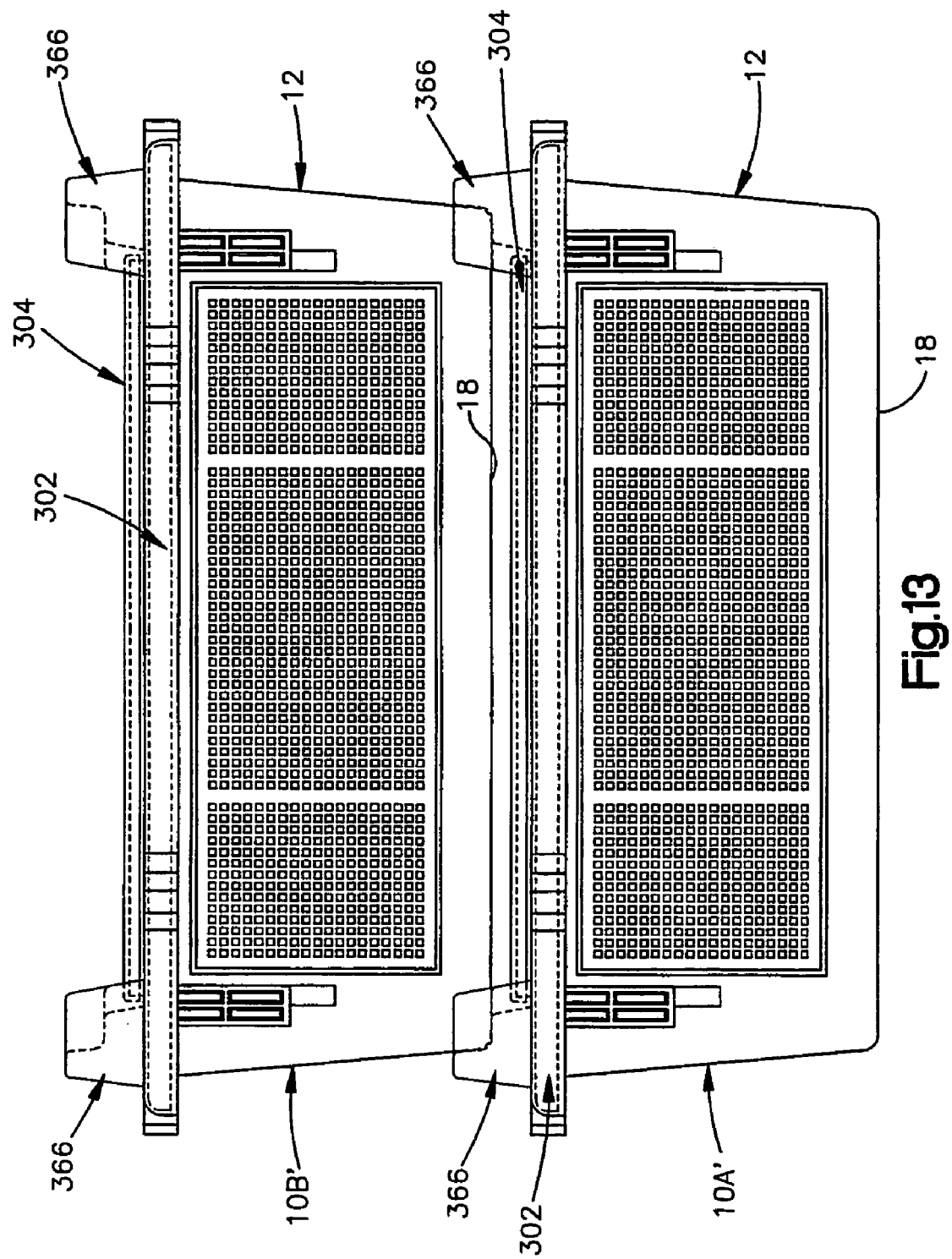
FIG. 13 illustrates first and second apparatuses, each constructed in accordance with the second embodiment of the present invention, in a stacked relationship.

To enable stacking of multiple apparatuses, the stacking protrusions 366 of the cover piece 302 are arranged so as to be capable of receiving the bottom wall 18 of the container 12. Thus, as shown in FIG. 13, the stacking protrusions 366 of a first apparatus 10A' may be used to support a second apparatus 10B'. When supported by the stacking protrusions 366 of the first apparatus 10A', the bottom wall 18 of the second apparatus 10B' rests on the horizontal support wall 374 of the stacking protrusions 366 of the first apparatus 10A'. As a result, the bottom wall 18 of the container 12 of the second apparatus 10B is spaced from the upper wall 382 of the closure piece 304 of the first apparatus 10A'. This allows air to flow through the air passages 414 in the closure piece 304 of the first apparatus 10A'. Additionally, the vertical support walls 376 of the stacking protrusions 366 of the first apparatus 10A' prevent movement of the second apparatus 10B' in a horizontal direction, i.e., parallel to the bottom wall 18 of the second apparatus 10B'.

Since the container 12 of the apparatus 10' is identical to the container of apparatus 10 of FIGS. 1–6, apparatus 10' may be placed in side-by-side or end-by-end connection with adjacent apparatuses in the same manner as discussed above with reference to FIG. 8. When positioned side-by-side and end-by-end, the side walls of the containers 12 of the adjacent apparatuses are separated from one another for enabling airflow into and out of the cavity 28 of each apparatus through the side walls of the container 12 of the apparatus.

From the above description of the invention, those skilled in the art will perceive improvements, changes and modifications. Such improvements, changes and modifications within the skill of the art are intended to be covered by the appended claims.

Having described the invention, we claim the following:

1. An apparatus for transporting laboratory animals, the apparatus comprising:
   a container defining a cavity for housing at least one laboratory animal, the container having an open top;
   a cover piece being connectable with the container for closing the open top of the container, the cover piece having a passage through which the at least one laboratory animal passes during insertion into and extraction from the cavity; and
   a closure piece being associated with the cover piece and including a portion that is rotatable relative to the cover piece between a first position in which the portion of the closure piece closes the passage in the cover piece to retain the at least one laboratory animal within the cavity and a second position in which the passage in the cover piece is open to permit the insertion and extraction of the at least one laboratory animal through the passage, the closure piece also including a plurality of air passages which permit airflow into and out of the cavity, filter material covering the air passages for preventing contaminants from entering the cavity,
   the closure piece including an aligning pin, the aligning pin extending downwardly from the closure piece, the cover piece including an aperture for receiving the aligning pin.

2. The apparatus of claim 1 wherein the closure piece, when in the first position, seals against the cover piece to prevent airflow into the cavity other than through the air passages.

3. The apparatus of claim 1 wherein the cover piece includes a viewing aperture for inspection of the cavity, the closure piece including a transparent portion which overlies the viewing aperture.

4. The apparatus of claim 1 wherein the closure piece includes a hinge that rotatably connects the rotatable portion of the closure piece to a remainder of the closure piece.

5. The apparatus of claim 1 wherein the closure piece is formed from a thermoplastic material and wherein the filter material is also formed from a thermoplastic material, the filter material being heat welded to the closure piece on a side of the closure piece opposite the cavity.

6. The apparatus of claim 1 wherein the cover piece includes an upper wall, a plurality of protrusions that extend upwardly from the upper wall of the cover piece in a direction opposite the container, the protrusions being capable of supporting a second container in a stacked relationship above the upper wall of the cover piece.

7. The apparatus of claim 1 further including a filter guard that is connectable to the closure piece for protecting the filter material from animals located outside of the cavity.

8. The apparatus of claim 1 wherein the rotatable portion of the closure piece includes a handle portion.

9. The apparatus of claim 8 wherein the cover piece includes a recess, the handle portion of the rotatable portion of the closure piece lying adjacent the recess when the rotatable portion of the closure piece is in the first position, the recess defining a space which provides access to the handle portion.

10. The apparatus of claim 1 wherein the container includes a bottom surface and at least one side wall, the at least one side wall including a plurality of air passages which permit airflow into and out of the cavity, filter material covering the air passages for preventing contaminants from entering the cavity.

11. The apparatus of claim 10 wherein the container is formed from a thermoplastic material and wherein the filter material is also formed from a thermoplastic material, the filter material being heat welded to the container on a side of the at least one side wall opposite the cavity.

12. The apparatus of claim 11 further including a filter guard that is connectable to the at least one side wall for protecting the filter material from animals located outside of the cavity.

13. The apparatus of claim 1 wherein the cover piece includes an outer periphery, at least one projection extending outwardly from the periphery of the cover piece for interlocking with similar projections on a second cover piece of a second apparatus.

14. An apparatus for transporting laboratory animals, the apparatus comprising:
a container defining a cavity for housing at least one laboratory animal, the container having an open top;
a cover piece being connectable with the container for closing the open top of the container, the cover piece having a passage through which the at least one laboratory animal passes during insertion into and extraction from the cavity; and
a closure piece being associated with the cover piece and including a portion that is rotatable relative to the cover piece between a first position in which the portion of the closure piece closes the passage in the cover piece to retain the at least one laboratory animal within the cavity and a second position in which the passage in the cover piece is open to permit the insertion and extraction of the at least one laboratory animal through the passage, the closure piece also including a plurality of air passages which permit airflow into and out of the cavity, filter material covering the air passages for preventing contaminants from entering the cavity,
the cover piece including a protuberance, the passage through which the at least one laboratory animal passes being located in an upper surface of the protuberance, the protuberance also including structure for securing the closure piece to the protuberance.

15. The apparatus of claim 14 wherein a viewing aperture extends through the upper surface of the protuberance, the viewing aperture enabling inspection of the cavity, the closure piece including a transparent portion which overlies the viewing aperture.

16. An apparatus for transporting laboratory animals, the apparatus comprising:
a container defining a cavity for housing at least one laboratory animal, the container having an open top;
a cover piece being connectable with the container for closing the open top of the container, the cover piece having a passage through which the at least one laboratory animal passes during insertion into and extraction from the cavity; and
a closure piece being associated with the cover piece and including a portion that is rotatable relative to the cover piece between a first position in which the portion of the closure piece closes the passage in the cover piece to retain the at least one laboratory animal within the cavity and a second position in which the passage in the cover piece is open to permit the insertion and extraction of the at least one laboratory animal through the passage, the closure piece also including a plurality of air passages which permit airflow into and out of the cavity, filter material covering the air passages for preventing contaminants from entering the cavity,
the closure piece including a raised ridge that outlines an area of the closure piece that includes the plurality of air passages.

17. An apparatus for transporting laboratory animals, the apparatus comprising:
a container defining a cavity for housing at least one laboratory animal, the container having a rim that defines an open top of the container;
a cover piece that is adapted to snap onto the rim of the container for connecting the cover piece to the container for closing the open top of the container, the cover piece including structure for securing the cover piece on the container to prevent removal of the cover piece from the container by the at least one laboratory animal, the cover piece further including a passage through which the at least one laboratory animal passes during insertion into and extraction from the cavity; and
a closure piece that is adapted to be supported by the cover piece, the closure piece including a portion that is rotatable relative to the cover piece between a first position in which the portion of the closure piece closes the passage in the cover piece to retain the at least one laboratory animal within the cavity and a second position in which the passage in the cover piece is open to permit the insertion and extraction of the at least one laboratory animal through the passage.

18. The apparatus of claim 17 wherein a plurality of air passages extend through one of the cover piece and the closure piece, the plurality of air passages permitting airflow into and out of the cavity, filter material covering the air passages for preventing contaminants from entering the cavity.

19. An apparatus for transporting laboratory animals, the apparatus comprising:
a container defining a cavity for housing at least one laboratory animal, the container having a bottom wall, at least one side wall, and an open top, the at least one side wall including a plurality of air passages that permit airflow into and out of the cavity, filter material covering the air passages for preventing contaminants from entering the cavity; and
structure for closing the open top of the container for retaining the at least one laboratory animal in the cavity, the structure including and outer periphery and a first mating protrusion that extends outwardly in a first direction beyond the outer periphery of the structure, the first mating protrusion being constructed for engaging a corresponding mating projection of an adjacent apparatus that is located beside the apparatus so as to prevent movement of the apparatus relative to the adjacent apparatus in a second direction that is perpendicular to the first direction, the structure further including a second mating protrusion that extends outwardly in the second direction beyond the outer periphery of the structure and is constructed for engaging a second corresponding mating protrusion of a second adjacent apparatus so as to prevent movement of the apparatus relative to the second adjacent apparatus in the first direction.

20. The apparatus of claim 19 wherein the first mating protrusion includes first and second projections, a space separating the first projection from the second projection.

21. The apparatus of claim 20 wherein the first projection extends outwardly in the first direction from the structure by a first distance and wherein the second projection includes a first portion that extends outwardly in the first direction from the structure by a second distance that is greater than the first distance.

22. The apparatus of claim 21 wherein the second projection also includes a second portion that extends outwardly in the first direction from the structure by the first distance, the second portion of the second projection being located opposite the first portion of the second projection from the first projection.

* * * * *